(12) United States Patent
Yang et al.

(10) Patent No.: US 9,736,858 B2
(45) Date of Patent: *Aug. 15, 2017

(54) METHOD AND APPARATUS FOR TRANSMITTING CONTROL INFORMATION IN WIRELESS COMMUNICATION SYSTEM

(71) Applicant: LG ELECTRONICS INC., Seoul (KR)

(72) Inventors: Suckchel Yang, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/833,600

(22) Filed: Aug. 24, 2015

(65) Prior Publication Data

US 2015/0365969 A1 Dec. 17, 2015

Related U.S. Application Data

(63) Continuation of application No. 14/336,881, filed on Jul. 21, 2014, now Pat. No. 9,148,262, which is a
(Continued)

(30) Foreign Application Priority Data

Apr. 18, 2013 (KR) .................. 10-2013-0042920

(51) Int. Cl.
*H04J 3/00* (2006.01)
*H04W 4/00* (2009.01)
(Continued)

(52) U.S. Cl.
CPC .......... *H04W 72/14* (2013.01); *H04L 1/1812* (2013.01); *H04L 1/1861* (2013.01); *H04L 5/001* (2013.01);
(Continued)

(58) Field of Classification Search
CPC ..................................................... H04W 72/14
See application file for complete search history.

(56) References Cited

U.S. PATENT DOCUMENTS 8,681,667 B2   3/2014   Dai et al.
2009/0103440 A1*  4/2009   Wang .................... H04L 1/1812
                                                    370/237
(Continued)

FOREIGN PATENT DOCUMENTS

| CN | 101465720 | 6/2009 |
|----|-----------|--------|
| CN | 101702644 | 5/2010 |
| WO | 2011/063244 | 5/2011 |
| WO | 2011/125996 | 10/2011 |

OTHER PUBLICATIONS

LG Electronics, "UL control channel design to support carrier aggregation," 3GPP TSG-RAN WG1 #56bis, R1-091204, Mar. 2009, 6 pages.
(Continued)

*Primary Examiner* — Gerald Smarth
(74) *Attorney, Agent, or Firm* — Lee Hong Degerman Kang Waimey

(57) ABSTRACT

The present invention relates to a wireless communication system. In particular, the present invention relates to a method and apparatus for transmitting control information by means of a terminal in a CA-based wireless communication system, including the steps of: forming first and second cells that include different subframe configurations, wherein the second cell includes TDD UL-DL configuration #0; receiving a UL grant by means of the first cell; and transmitting data corresponding to the UL grant by means of the second cell.

16 Claims, 15 Drawing Sheets

Related U.S. Application Data continuation of application No. 14/372,127, filed as application No. PCT/KR2013/003298 on Apr. 18, 2013, now Pat. No. 9,049,704.

(60) Provisional application No. 61/625,682, filed on Apr. 18, 2012, provisional application No. 61/751,230, filed on Jan. 10, 2013, provisional application No. 61/753,919, filed on Jan. 17, 2013, provisional application No. 61/759,428, filed on Feb. 1, 2013.

(51) Int. Cl.

| | | |
|---|---|---|
| *H04W 72/14* | (2009.01) | |
| *H04L 1/18* | (2006.01) | |
| *H04L 5/00* | (2006.01) | |
| *H04L 5/14* | (2006.01) | |
| *H04W 72/12* | (2009.01) | |

(52) U.S. Cl.
CPC .......... *H04L 5/0091* (2013.01); *H04L 5/1469* (2013.01); *H04W 72/1284* (2013.01); *H04L 5/0048* (2013.01); *H04L 5/0055* (2013.01); *H04L 5/0062* (2013.01)

(56) References Cited

U.S. PATENT DOCUMENTS

| | | | | |
|---|---|---|---|---|
| 2009/0268693 | A1* | 10/2009 | Lindh | H04W 72/042 370/336 |
| 2010/0195629 | A1 | 8/2010 | Chen et al. | |
| 2011/0310830 | A1* | 12/2011 | Wu | H04W 72/1289 370/329 |
| 2012/0057487 | A1 | 3/2012 | Ahn et al. | |
| 2012/0057539 | A1* | 3/2012 | Kuo | H04W 36/0094 370/329 |
| 2012/0076078 | A1 | 3/2012 | Han et al. | |
| 2012/0230272 | A1* | 9/2012 | Kim | H04L 1/1861 370/329 |
| 2012/0327916 | A1 | 12/2012 | Ahn et al. | |
| 2013/0028216 | A1 | 1/2013 | Baldemair et al. | |
| 2013/0034028 | A1* | 2/2013 | Chen | H04L 1/1854 370/280 |
| 2013/0242829 | A1 | 9/2013 | Ge et al. | |

OTHER PUBLICATIONS

Nokia et al., "L1 control signaling with carrier aggregation in LTE-Advanced," 3GPP TSG-RAN WG1 Meeting #54bis, R1-083730, Sep.-Oct. 2008, 7 pages.

LG Electronics, "Uplink ACK/NACK transmission in LTE-Advanced," 3GPP TSG-RAN WG1 #58bis, R1-094163, Oct. 2009, 6 pages.

Etri, "ACK/NACK Transmission on PUCCH for Carrier Aggregation," 3GPP TSG-RAN WG1 Meeting #59bis, R1-100462, Jan. 2010, 5 pages.

3rd Generation Partnership Project (3GPP), "Technical Specification Group Radio Access Network; Evolved Universal Terrestrial Radio Access (E-UTRA); Physical layer procedures (Release 10)," 3GPP TS 36.213 V10.5.0, Mar. 2012, 125 pages.

InterDigital Communications, LLC, "Cross-carrier scheduling for TDD Inter-Band CA," 3GPP TSG-RAN WG1 Meeting #68bis, R1-121307, Mar. 2012, 6 pages.

ZTE, "Scheduling and HARQ timing for cross-carrier PUSCH scheduling for TDD CA with different UL-DL configurations," 3GPP TSG RAN WG1 Meeting #68bis, R1-121058, Mar. 2012, 8 pages.

Research in Motion, UK Limited, "Views on open Issues of HARQ-ACK Timing in Inter-band CA with Different TDD Configurations," 3GPP TSG RAN WG1 Meeting #68bis, R1-121484, Mar. 2012, 4 pages.

PCT International Application No. PCT/KR2013/003298, Written Opinion of the International Searching Authority dated Jul. 23, 2013, 13 pages.

United States Patent and Trademark Office Application U.S. Appl. No. 14/372,127, Notice of Allowance dated Jan. 23, 2015, 9 pages.

3rd Generation Partnership Project (3GPP), "Technical Specification Group Radio Access Network; Evolved Universal Terrestrial Radio Access (E-UTRA); Physical layer procedures (Release 10)," 3GPP TS 36.213 V10.5.0, XP-50579996, Mar. 2012, 125 pages.

InterDigital Communications, LLC, "Cross-carrier scheduling for TDD Inter-Band CA," 3GPP TSG-RAN WG1 Meeting #68bis, R1-121307, XP-50599597, Mar. 2012, 6 pages.

Qualcomm Incorporated, "Control for Carrier Aggregation of Different TDD UL-DL Configurations on Different Bands," 3GPP TSG-RAN WG1 #67, R1-114106, XP-50562082, Nov. 2011, 4 pages.

Renesas Mobile Europe, "Discussion on Common Solution CC specific TDD configuration," 3GPP TSG-RAN WG1 Meeting #68, R1-120370, XP-50563208, Feb. 2012, 10 pages.

Email Rapporteur (CMCC), "Email summary on inter-band TDD CA," 3GPP TSG RAN WG1 Meeting #68bis, R1-121719, XP-50600074, Mar. 2012, 23 pages.

Samsung, "DL/UL HARQ-ACK timing in CA with different TDD UL-DL configurations," 3GPP TSG RAN WG1 #67, R1-114217, XP-50562323, Nov. 2011, 4 pages.

European Patent Office Application Serial No. 13778400.5, Search Report dated Sep. 11, 2015, 11 pages.

The State Intellectual Property Office of the People's Republic of China Application Serial No. 201380012365.X, Office Action dated Oct. 20, 2016, 8 pages.

\* cited by examiner

PHICH/UL grant-PUSCH timing (UL-DL configuration #1)

PUSCH-PHICH/UL grant timing (UL-DL configuration #1)

METHOD AND APPARATUS FOR TRANSMITTING CONTROL INFORMATION IN WIRELESS COMMUNICATION SYSTEM

This application is a continuation of U.S. application Ser. No. 14/336,881, filed on Jul. 21, 2014, now U.S. Pat. No. 9,148,262, which is a continuation of U.S. application Ser. No. 14/372,127, filed on Jul. 14, 2014, now U.S. Pat. No. 9,049,704, which is the National Stage filing under 35 U.S.C. 371 of International Application No. PCT/KR2013/003298, filed on Apr. 18, 2013, which claims the benefit of earlier filing date and right of priority to Korean Patent Application No. 10-2013-0042920, filed on Apr. 18, 2013, and also claims the benefit of U.S. Provisional Application Nos. 61/625,682, filed on Apr. 18, 2012, 61/751,230, filed on Jan. 10, 2013, 61/753,919, filed on Jan. 17, 2013 and 61/759,428, filed on Feb. 1, 2013, the contents of which are all hereby incorporated by reference herein in their entirety.

TECHNICAL FIELD

The present invention relates to a wireless communication system and, more particularly, to a method for transmitting control information in a carrier aggregation (CA) based wireless communication system and an apparatus for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE

Technical Problem

An object of the present invention devised to solve the problem lies in a method for transmitting control information in a CA-based wireless communication system and an apparatus for the same. Another object of the present invention is to provide a method for efficiently transmitting/receiving acknowledgement information on an uplink signal and an apparatus for the same.

The technical problems solved by the present invention are not limited to the above technical problems and those skilled in the art may understand other technical problems from the following description.

Technical Solution

The object of the present invention can be achieved by providing a method for performing a hybrid automatic repeat request (HARQ) procedure by a user equipment (UE) in a carrier aggregation (CA)-based wireless communication system, the method including: configuring a first cell and a second cell having different subframe configurations, the second cell having time division duplex uplink-downlink (TDD UL-DL) configuration #0; receiving a UL grant through the first cell; and transmitting data corresponding to the UL grant through the second cell, wherein a physical hybrid ARQ indicator channel (PHICH) resource for the data is determined by the following equations in the first cell, $$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA} / N_{PHICH}^{group} \rfloor + n_{DMRS}) \bmod 2N_{SF}^{PHICH}$$

wherein $n_{PHICH}^{group}$ represents a PHICH group index, $n_{PHICH}^{seq}$ represents an orthogonal sequence index, $I_{PRB\_RA}$ denotes a value relates to the index of a resource block used to transmit the data $n_{DMRS}$ is obtained from a value of a demodulation reference signal (DMRS)-related field in scheduling information, $N_{PHICH}^{group}$ indicates the number of PHICH groups, $N_{SF}^{PHICH}$ indicates an orthogonal sequence length, and $I_{PHICH}$ is 0 or 1, wherein retransmission for the data is performed on the basis of at least one of the PHICH and the UL grant when PHICH resource of $I_{PHICH}=0$ is corresponding to the data, wherein retransmission for the data is performed on the basis of only the UL grant when PHICH resource of $I_{PHICH}=1$ is corresponding to the data.

In another aspect of the present invention, provided herein is a UE configured to perform a HARQ procedure in a CA-based wireless communication system, the UE including: a radio frequency (RF) unit; and a processor, wherein the processor is configured to configure a first cell and a second cell having different subframe configurations, the second cell having time division duplex uplink-downlink (TDD UL-DL) configuration #0, to receive a UL grant through the first cell and to transmit data corresponding to the UL grant through the second cell, wherein a physical hybrid ARQ indicator channel (PHICH) resource for the data is determined by the following equations in the first cell, $$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA} / N_{PHICH}^{group} \rfloor + n_{DMRS}) \bmod 2N_{SF}^{PHICH}$$

wherein $n_{PHICH}^{group}$ represents a PHICH group index, $n_{PHICH}^{seq}$ represents an orthogonal sequence index, $I_{PRB\_RA}$ denotes a value relates to the index of a resource block used to transmit the data $n_{DMRS}$ is obtained from a value of a DMRS-related field in scheduling information, $N_{PHICH}^{group}$ indicates the number of PHICH groups, $N_{SF}^{PHICH}$ indicates an orthogonal sequence length, and $I_{PHICH}$ is 0 or 1, wherein retransmission for the data is performed on the basis of at least one of the PHICH and the UL grant when PHICH resource of $I_{PHICH}=0$ is corresponding to the data, wherein retransmission for the data is performed on the basis of only the UL grant when the PHICH resource of $I_{PHICH}=1$ is corresponding to the data.

The subframe configuration of the first cell may be configured according to c one of TDD UL-DL configurations #1 to #6 or may be configured according to frequency division duplex (FDD), and subframe configurations according to TDD UL-DL configurations #1 to #6 are shown in the following table,

| UL-DL | Subframe number | | | | | | | | | |
|---|---|---|---|---|---|---|---|---|---|---|
| configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein D indicates a DL subframe (SF), U indicates a UL SF and S indicates a special SF.

The UL grant may include UL scheduling information for at least one of a first UL SF and a second UL SF, the first UL SF preceding the second UL SF, wherein retransmission for data of the first UL SF is performed on the basis of at least one of the PHICH and the UL grant and retransmission for data of the second UL SF is performed on the basis of only the UL grant.

When the PHICH resource of $I_{PHICH}=1$ is corresponding to the data, acknowledgement (ACK) information may be signaled to a HARQ process of a medium access control (MAC) layer in a corresponding transmission time interval (TTI).

The first cell may be a scheduling cell and the second cell may be a scheduled cell.

Advantageous Effects

According to the present invention, it is possible to efficiently transmit control information in a CA-based wireless communication system. In addition, it is possible to efficiently transmit/receive acknowledgement information on an uplink signal.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
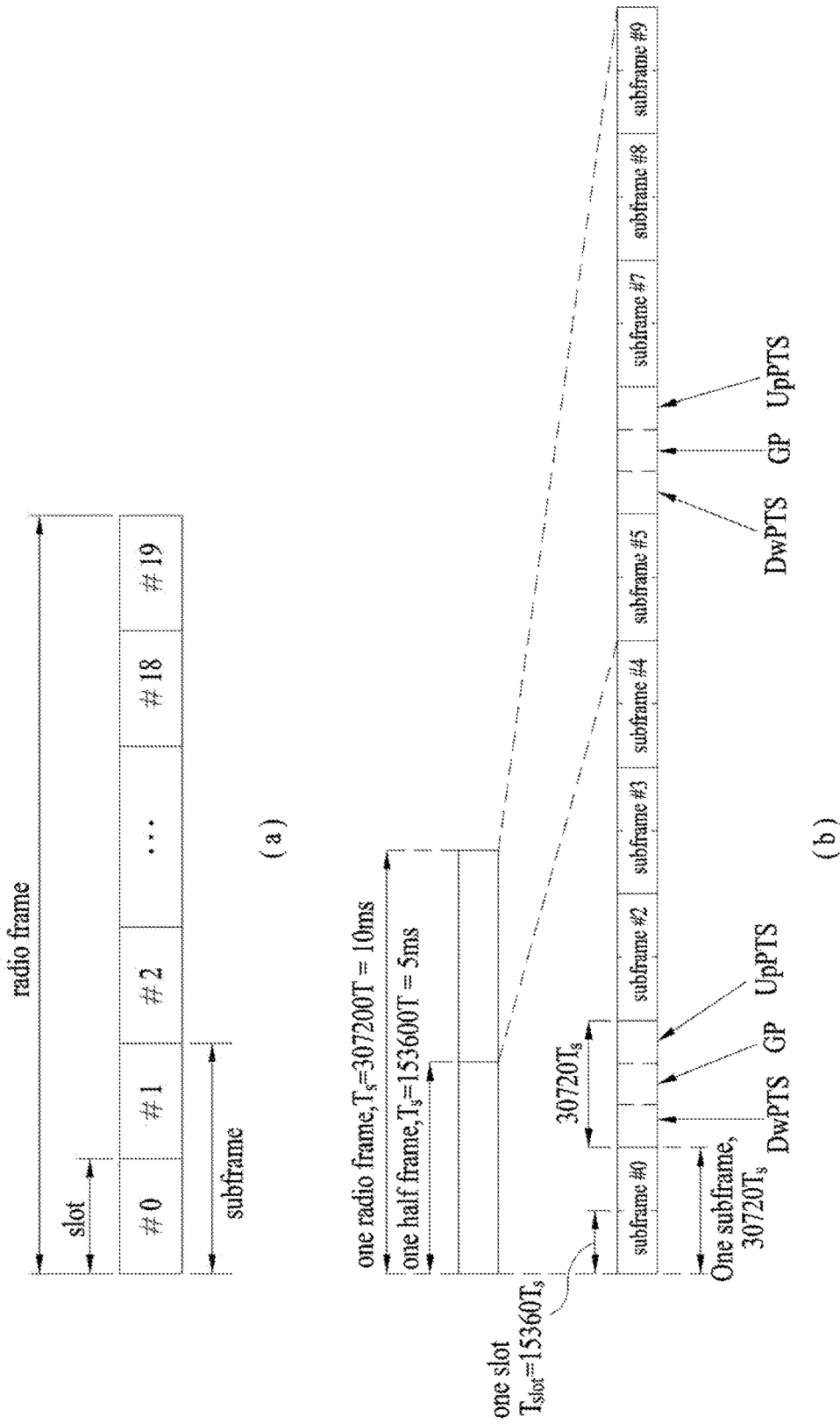
FIG. 1 illustrates a radio frame structure.

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

In a wireless communication system, a user equipment (UE) receives information from a base station (BS) on downlink (DL) and transmits information to the BS on uplink (UL). In LTE(-A), DL transmission is performed using OFDMA and uplink transmission is performed using single carrier frequency division multiple access (SC-FDMA).

The terms used in the specification are described.

HARQ-ACK (Hybrid Automatic Repeat request-Acknowledgement): this represents an acknowledgment response to downlink transmission (e.g. PDSCH (Physical Downlink Shared Channel) or SPS release PDCCH (Semi-Persistent Scheduling release Physical Downlink Control Channel), that is, an ACK/NACK (Negative ACK)/DTX (Discontinuous Transmission) response (simply, ACK/NACK (response), A/N (response)). The ACK/NACK/DTX response refers to ACK, NACK, DTX or NACK/DTX. HARQ-ACK for a specific CC (Component Carrier) (or cell) or HARQ-ACK of a specific CC refers to an ACK/NACK response to downlink transmission related to (e.g. scheduled for) the corresponding CC. A PDSCH can be replaced by a transport block (TB) or a codeword.

PDSCH: this includes a DL grant PDCCH and a SPS PDSCH.

SPS PDSCH: this is a PDSCH transmitted using DL resources semi-statically set according to SPS. The SPS PDSCH has no DL grant PDCCH corresponding thereto. The SPS PDSCH is used interchangeably with a PDSCH without (w/o) PDCCH in the specification.

SPS release PDCCH: this refers to a PDCCH indicating SPS release. A UE feeds back ACK/NACK information about an SPS release PDCCH.

PCC (Primary Component Carrier) PDCCH: this refers to a PDCCH that schedules a PCC. That is, the PCC PDCCH indicates a PDCCH corresponding to a PDSCH on the PCC. The PCC PDCCH is transmitted only on the PCC on the assumption that cross-carrier scheduling (or cross-CC (component carrier) scheduling) is not permitted for the PCC. The PCC is used interchangeably with a primary cell (PCell).

SCC (Secondary Component Carrier) PDCCH: this refers to a PDCCH that schedules an SCC. That is, the SCC PDCCH indicates a PDCCH corresponding to a PDSCH on the SCC. The SCC PDCCH may be transmitted on a CC (e.g. PCC) other than the SCC when cross-carrier scheduling is permitted for the SCC. When cross-carrier scheduling is not permitted for the SCC, the SCC PDCCH is transmitted only on the SCC. The SCC is used interchangeably with a second cell (SCell).

Cross-carrier scheduling: this refers to an operation of transmitting a PDCCH that schedules an SCC through a CC (e.g. PCC) instead of the SCC. When only two CCs, a PCC and an SCC, are present, the PDCCH may be scheduled/transmitted only through the PCC.

Non-cross-carrier scheduling (or non-cross-CC scheduling, self-scheduling): this refers to an operation of scheduling/transmitting a PDCCH that schedules a CC through the CC.

FIG. 1 illustrates a radio frame structure.

FIG. 1(a) illustrates a type-1 radio frame structure for frequency division duplex (FDD). A radio frame includes a plurality of (e.g. 10) subframes each of which includes a plurality of (e.g. 2) slots in the time domain. Each subframe has a duration of 1 ms and each slot has a duration of 0.5 ms. A slot includes a plurality of OFDM/SC-FDMA symbols in the time domain and includes a plurality of resource blocks (RBs) in the frequency domain.

FIG. 1(b) illustrates a type-2 radio frame structure for time division duplex (TDD). The type-2 radio frame includes 2 half frames. Each half frame includes 5 subframes each of which includes 2 slots.

Table 1 shows UL-DL configurations of subframes in a radio frame in the TDD mode.

TABLE 1

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Figure 2:
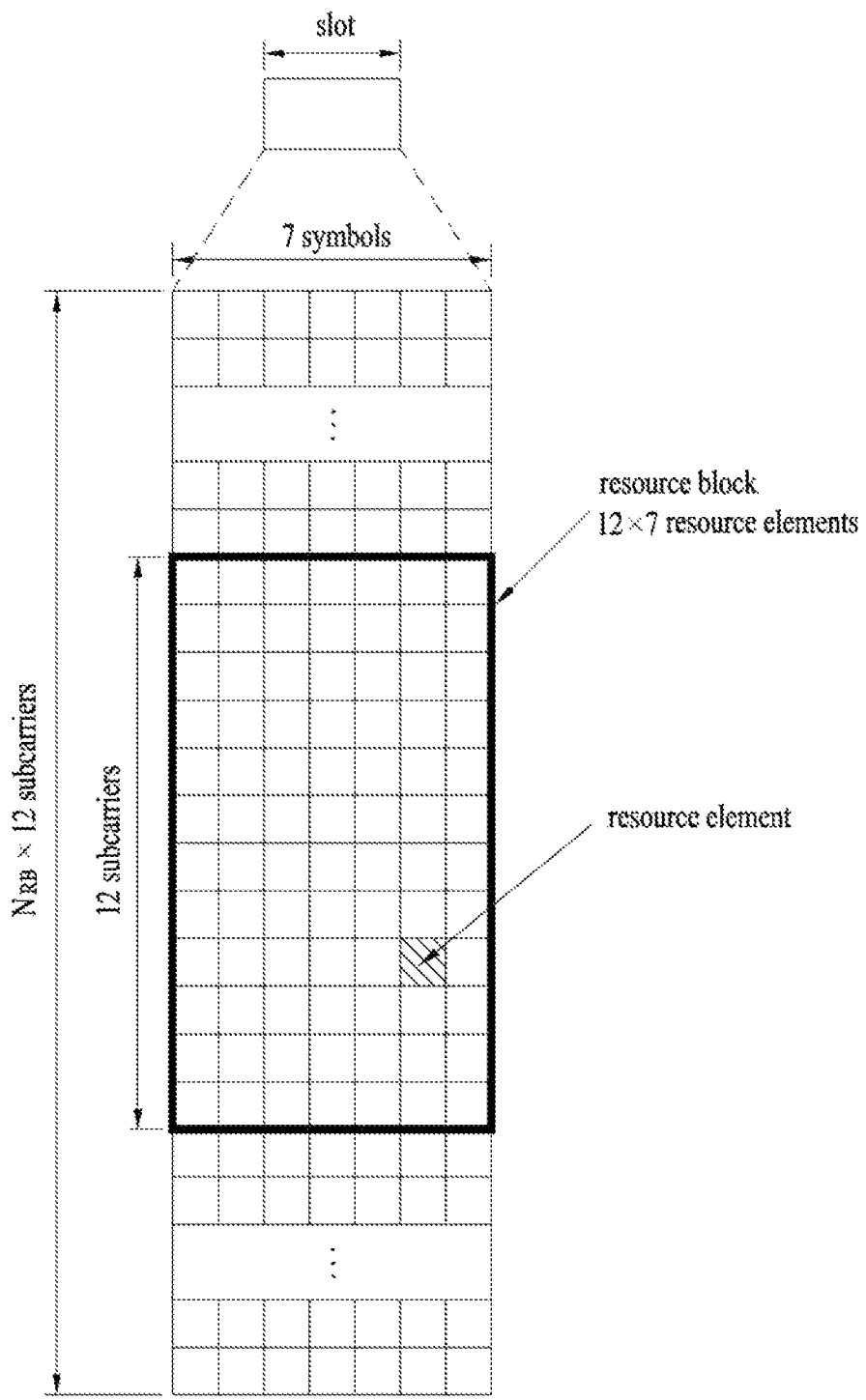
FIG. 2 illustrates a resource grid of a downlink slot.

FIG. 2 illustrates a resource grid of a DL slot.

Referring to FIG. 2, a DL slot includes a plurality of OFDMA (or OFDM) symbols in the time domain. One DL slot may include 7(6) OFDMA symbols according to cyclic prefix (CP) length, and one resource block (RB) may include 12 subcarriers in the frequency domain. Each element on the resource grid is referred to as a resource element (RE). One RB includes 12×7(6) REs. The number NiB of RBs included in the downlink slot depends on a downlink transmit bandwidth. The structure of a UL slot may be same as that of the DL slot except that OFDMS symbols by replaced by SC-FDMA symbols.

Figure 3:
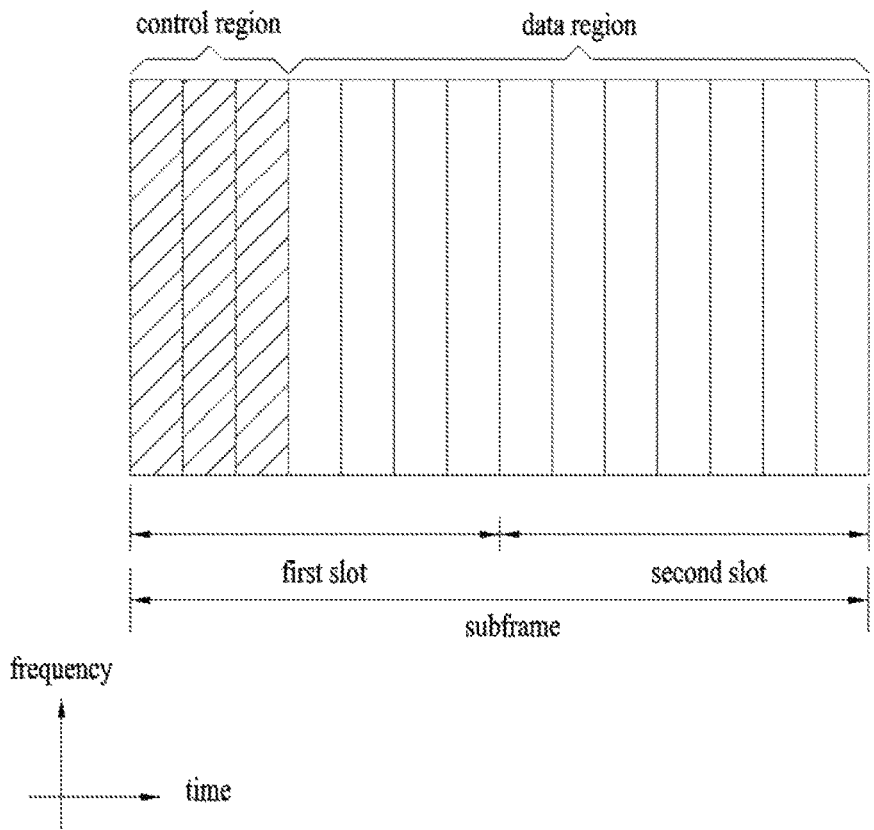
FIG. 3 illustrates a downlink subframe structure.

FIG. 3 illustrates a DL subframe structure.

Referring to FIG. 3, a maximum of three (four) OFDMS symbols located in a front portion of a first slot within a subframe correspond to a control region to which a control channel is allocated. The remaining OFDMS symbols correspond to a data region to which a physical downlink shared chancel (PDSCH) is allocated. Examples of DL control channels include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ-ACK signal.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. Downlink control information (DCI) is transmitted through the PDCCH. DCI formats 0/4 (referred to as UL DCI formats hereinafter) for UL scheduling (or UL grant (UG)) and DCI formats 1/1A/1B/1C/1D/2/2A/2B/2C/2D (referred to as DL DCI formats) DL scheduling are defined. The DCI formats selectively include information such as hopping flag, RB allocation, MCS (Modulation Coding Scheme), RV (Redundancy Version), NDI (New Data Indicator), TPC (Transmit Power Control), DMRS (Demodulation Reference Signal) cyclic shift, etc. as necessary.

A plurality of PDCCHs can be transmitted within a control region. A UE monitors the plurality of PDCCHs per subframe in order to check a PDCCH destined therefor. The PDCCH is transmitted through one or more control channel elements (CCEs). A PDCCH coding rate may be controlled by the number of CCEs (i.e. CCE aggregation level) used for PDCCH transmission. A CCE includes a plurality of resource element groups (REGs). A format of the PDCCH and the number of PDCCH bits are determined by the number of CCEs. A BS determines a PDCCH format according to DCI to be transmitted to the UE, and attaches a cyclic redundancy check (CRC) to control information. The CRC is masked with an identifier (e.g. a radio network temporary identifier (RNTI)) according to an owner or usage of the PDCCH. If the PDCCH is for a specific UE, then an identifier (e.g., cell-RNTI (C-RNTI)) of the UE may be masked to the CRC. If the PDCCH is for a paging message, then a paging identifier (e.g., paging-RNTI (P-RNTI)) may be masked to the CRC. If the PDCCH is for system information (more specifically, a system information block (SIB)), then a system information RNTI (SI-RNTI) may be masked to the CRC. When the PDCCH is for a random access response, then a random access-RNTI (RA-RNTI) may be masked to the CRC.

Figure 4:
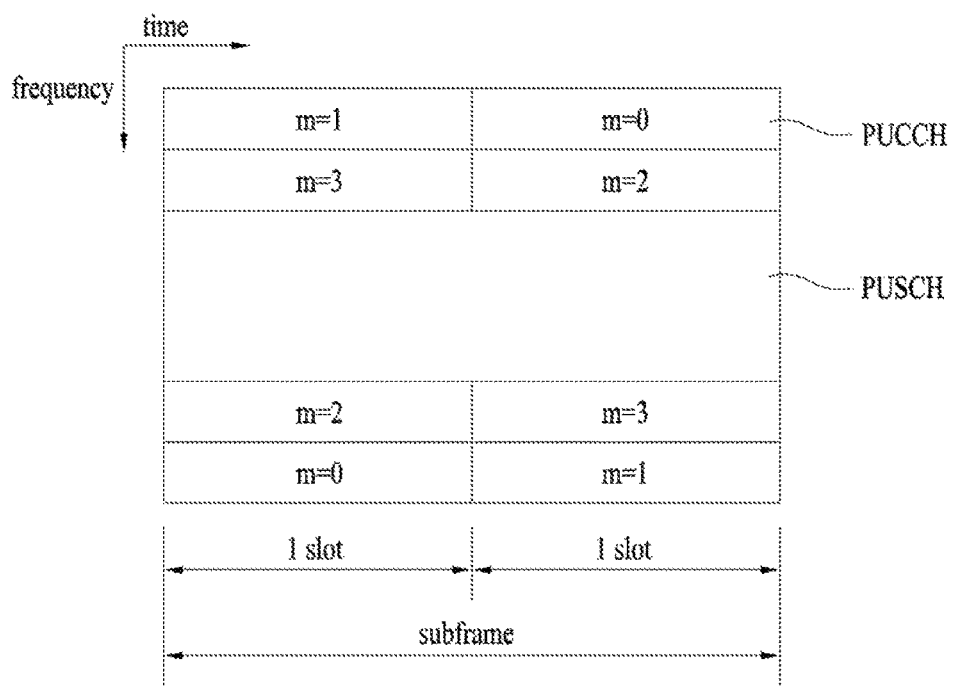
FIG. 4 illustrates an uplink subframe structure.

FIG. 4 illustrates a UL subframe structure.

Referring to FIG. 4, a UL subframe includes a plurality of (e.g. 2) slots. A slot may include different numbers of SC-FDMA symbols according to CP lengths. The UL subframe is divided into a control region and a data region in the frequency domain. The data region is used to carry a data signal such as audio data through a physical uplink shared channel (PUSCH). The control region is used to carry uplink control information (UCI) through a physical uplink control channel (PUCCH). The PUCCH includes an RB pair located at both ends of the data region in the frequency domain and hopped in a slot boundary.

The PUCCH can be used to transmit the following control information.

SR (scheduling request): This is information used to request a UL-SCH resource and is transmitted using On-Off Keying (OOK) scheme.

HARQ-ACK: This is an acknowledgement signal for a DL signal (e.g. a PDSCH or SPS release PDCCH). For example, a 1-bit ACK/NACK signal is transmitted as a response to a single DL codeword and a 2-bit ACK/NACK signal is transmitted as a response to two DL codewords.

CSI (channel state information): This is feedback information about a DL channel. The CSI includes a CQI (channel quality indicator), RI (rank indicator), PMI (precoding matrix indicator), PTI (precoding type indicator), etc.

Table 2 shows the mapping relationship between PUCCH formats and UCI in LTE(-A).

TABLE 2

| PUCCH format | UCI (Uplink Control Information) |
| --- | --- |
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CSI (20 coded bits) |
| Format 2 | CSI and 1- or 2-bit HARQ ACK/NACK (20 bits) (corresponding to only extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 coded bits) |

A description will be given of ACK/NACK, UG, PHICH and PUSCH transmission timing in a CC (or cell) configured in TDD with reference to FIGS. 5 and 6.

Figure 5:
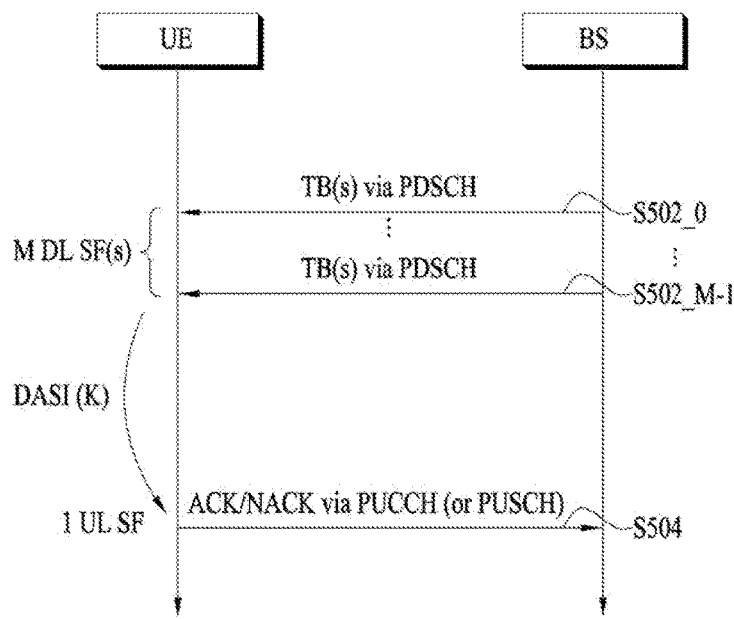
FIGS. 5 and 6 illustrates UL grant (UG)/physical hybrid ARQ indicator channel (PHICH) physical uplink shared channel (PUSCH) timing.
Figure 6:
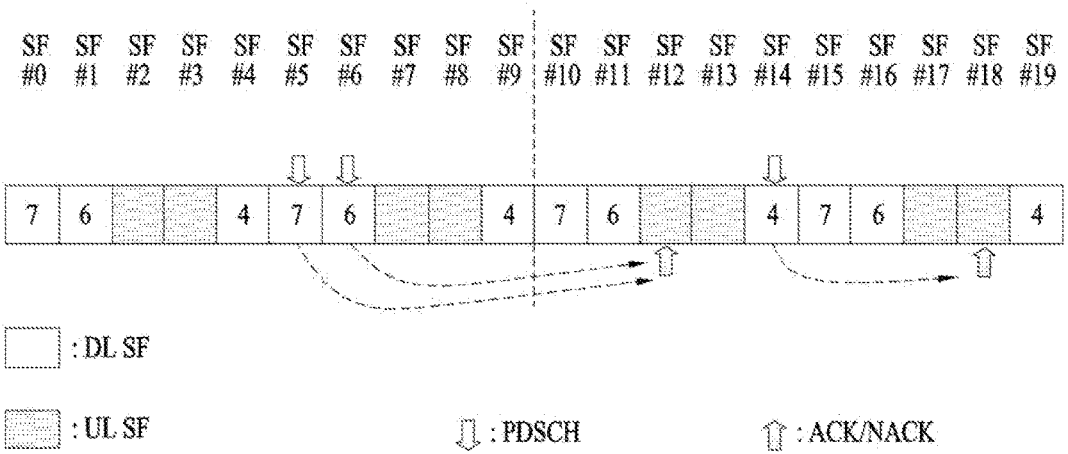

FIGS. 5 and 6 illustrates ACK/NACK (A/N) timing (or HARQ timing).

Referring to FIG. 5, a UE may receive one or more PDSCH signals in M DL subframes (SFs) (S502_0 to S502_M-1) (M≥1). Each PDSCH signal includes one or more (e.g. 2) transport blocks (TBs) according to transmission mode. A PDCCH signal indicating SPS release may be received in step S502_0 to S5002_M-1. When a PDSCH signal and/or an SPS release PDCCH signal are present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M-1.

While ACK/NACK is transmitted through a PUCCH basically, ACK/NACK may be transmitted through a PUSCH when a PUSCH is transmitted at ACK/NACK transmission time. When a plurality of CCs is configured for the UE, the PUCCH is transmitted only on a PCC and the PUSCH is transmitted on a scheduled CC. Various PUCCH formats shown in Table 2 may be used for ACK/NACK transmission. To reduce the number of ACK/NACK bits transmitted through a PUCCH format, various methods such as ACK/NACK bundling and ACK/NACK channel selection may be used.

As described above, in TDD, ACK/NACK relating to data received in the M DL subframes is transmitted through one UL subframe (i.e. M DL SF(s): 1 UL SF) and the relationship therebetween is determined by a DASI (downlink association set index).

Table 3 shows DASI (K: {k0, k1, . . . , $k_{M-1}$}) defined in LTE(-A). Table 3 shows spacing between a UL subframe transmitting ACK/NACK and a DL subframe relating to the UL subframe. Specifically, when a PDSCH signal and/or a PDCCH indicating SPS release are present in a subframe n−k (k∈K), the UE transmits ACK/NACK in a subframe n.

TABLE 3

| TDD UL-DL Config- | Subframe n | | | | | | | | | |
| --- | --- | --- | --- | --- | --- | --- | --- | --- | --- | --- |
| uration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

FIG. 6 illustrates A/N timing applied to a CC having UL-DL configuration #1. SF#0 to #9 and SF#10 to #19 respectively correspond to radio frames, and numerals in blocks denote UL subframes relating to DL subframes. For example, A/N corresponding to a PDSCH of SF#5 is transmitted in SF#5+7 (=SF #12) and A/N corresponding to a PDSCH of SF#6 is transmitted in SF#6+6 (=SF #12). That is, both A/Ns respectively corresponding the PDSCHs of SF#5 and SF#6 are transmitted in SF #12. Similarly, A/N corresponding to a PDSCH of SF#14 is transmitted in SF#14+4 (=SF #18).

Figure 7:
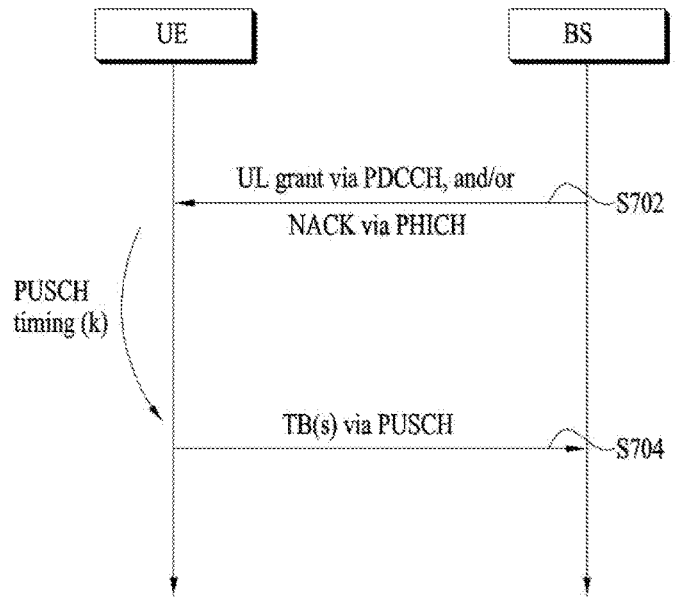
FIGS. 7 and 8 illustrate UL grant/PHICH-PUSCH timing.
Figure 8:
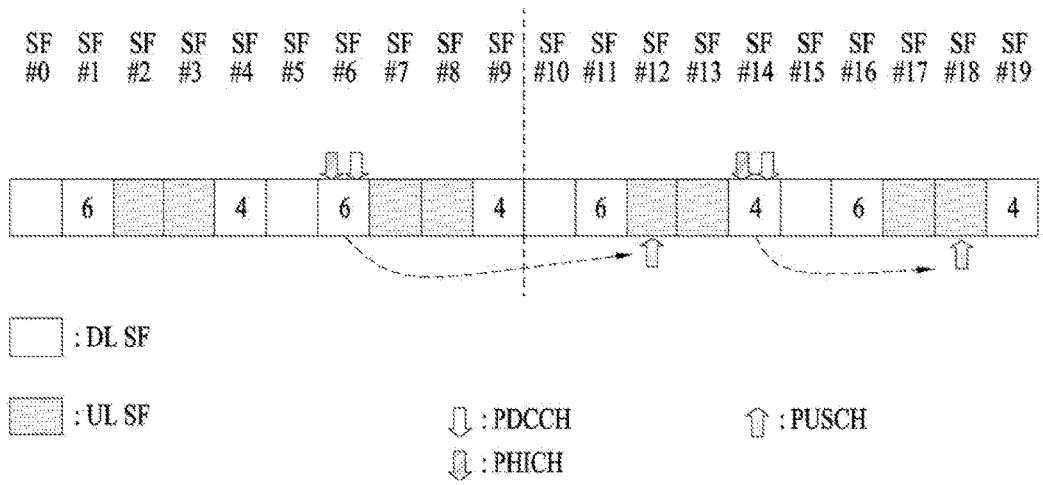

FIGS. 7 and 8 illustrate UG/PHICH-PUSCH timing. A PUSCH may be transmitted corresponding to a PDCCH (UG) and/or a PHICH (NACK).

Referring to FIG. 7, the UE may receive a PDCCH (UG) and/or a PHICH (NACK) (S702). Here, NACK corresponds to an A/N response to previous PUSCH transmission. In this case, the UE may initially transmit/retransmit one or more TBs through a PUSCH after k subframes via processes for PUSCH transmission (e.g. TB coding, TB-CW (transport block-codeword) swiping, PUSCH resource allocation, etc.) (S704). The present embodiment is based on the assumption that a normal HARQ operation in which a PUSCH is transmitted once is performed. In this case, a PHICH and a UG corresponding to PUSCH transmission are present in the same subframe. However, in case of subframe bundling in which a PUSCH is transmitted multiple times through a plurality of subframes, a PHICH and a UG corresponding to PUSCH transmission may be present in different subframes.

Table 4 shows a UAI (Unlink Association Index) (k) for PUSCH transmission in LTE(-A). Table 4 shows spacing between a DL subframe from which a PHICH/UG is detected and a UL subframe relating to the DL subframe. Specifically, when a PHICH/UG is detected from a subframe n, the UE may transmit a PUSCH in a subframe n+k.

TABLE 4

| TDD UL-DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 6 | | | | 4 | 6 | |
| 1 | | | 6 | | | 4 | | | 6 | | 4 |
| 2 | | | 4 | | | | | | 4 | | |
| 3 | 4 | | | | | | | 4 | 4 | |
| 4 | | | | | | | | 4 | 4 | |
| 5 | | | | | | | | 4 | | |
| 6 | 7 | 7 | | | | | 7 | 7 | | 5 |

FIG. 8 illustrates PUSCH transmission timing when UL-DL configuration #1 is set. In the figure, SF#0 to #9 and SF#10 to #19 respectively correspond to radio frames, and numerals in blocks denote UL subframes relating to DL subframes. For example, a PUSCH corresponding to PHICH/UG of SF#6 is transmitted in SF#6+6 (=SF#12) and a PUSCH corresponding to a PHICH/UG of SF#14 is transmitted in SF#14+4 (=SF#18).

Figure 9:
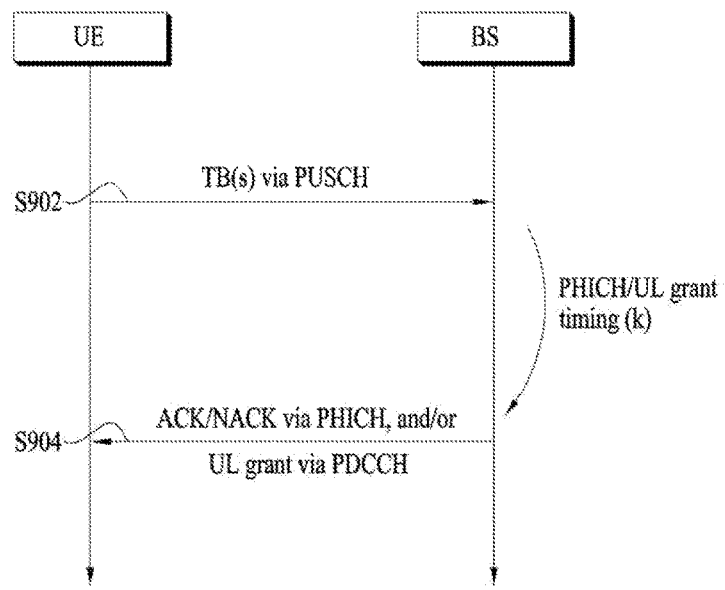
FIGS. 9 and 10 illustrate PUSCH-UL grant/PHICH timing.
Figure 10:
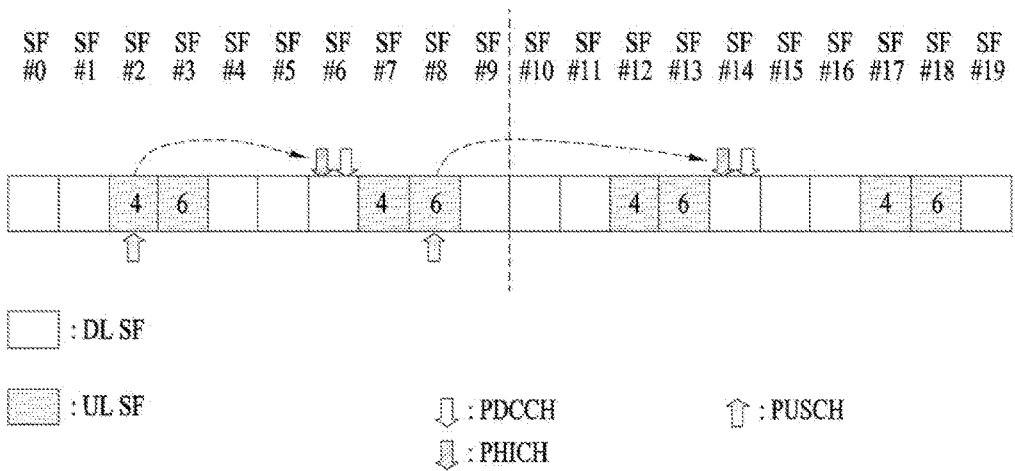

FIGS. 9 and 10 illustrate PUSCH-UG/PHICH timing. A PHICH is used to transmit DL ACK/NACK. Here, DL ACK/NACK refers to ACK/NACK transmitted on downlink as a response to UL data (e.g. PUSCH).

Referring to FIG. 9, the UE transmits a PUSCH signal to the BS (S902). Here, the PUSCH signal is used to transmit one or a plurality of (e.g. 2) TBs according to transmission mode. The BS may transmit ACK/NACK as a response to PUSCH transmission through a PHICH after k subframes via processes for ACK/NACK transmission (e.g. ACK/NACK generation, ACK/NACK resource allocation, etc.) (S904). A/N includes acknowledgement information about the PUSCH signal of step S902. When a response to PUSCH transmission is NACK, the BS may transmit a UG PDCCH for PUSCH retransmission to the UE after k subframes (S904). In a normal HARQ operation, a UG and a PHICH used for PUSCH transmission may be transmitted in the same subframe. In case of subframe bundling, however, the UG and PHICH used for PUSCH transmission may be transmitted in different subframes.

Table 5 shows PHICH timing defined in TDD. The UE determines a PHICH resource corresponding to a subframe #(n+k$_{PHICH}$) for PUSCH transmission in a subframe #n.

TABLE 5

| TDD UL-DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

FIG. 10 illustrates UG/PHICH transmission timing when UL-DL configuration #1 is set. In the figure, SF#0 to #9 and SF#10 to #19 respectively correspond to radio frames, and numerals in blocks denote DL subframes relating to UL subframes. For example, a PHICH/UG corresponding to a PUSCH of SF#2 is transmitted in SF#2+4 (=SF#6) and a PHICH/UG corresponding to a PUSCH of SF#8 is transmitted in SF#8+6 (=SF#14).

Figure 11:
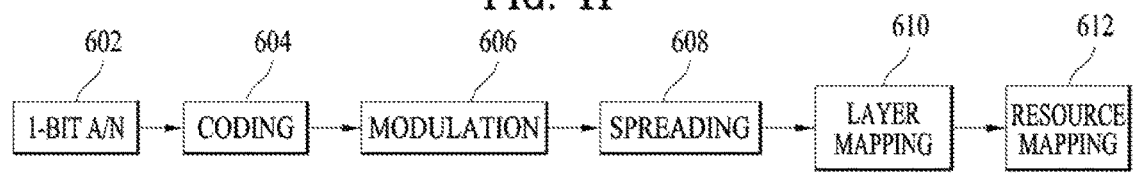
FIG. 11 illustrates a PHICH signal processing procedure and processing blocks.

FIG. 11 illustrates a PHICH signal processing procedure and processing blocks.

Referring to FIG. 11, an A/N generation block 602 generates a 1-bit A/N signal as a response to a PUSCH in case of MU-MIMO (multi-user multiple input multiple output) and generates two 1-bit A/N signals as a response to a PUSCH in case of SU-MIMO (single-user MIMO). Subsequently, (channel) coding (604) (e.g. ⅓ repetition coding)), modulation (606) (e.g. BPSK (binary phase shift keying)), spreading (608), layer mapping (610) and resource mapping (612) are applied to the A/N bit for PHICH generation.

A plurality of PHICHs may be mapped to the same RE (e.g. REG) to form a PHICH group. The REG is composed of 4 neighboring REs from among REs left when REs for a reference signal are excluded on an OFDM symbol. Each PHICH is identified by an orthogonal sequence (used for spreading) in the PHICH group. Accordingly, a PHICH resource is identified by an index pair ($n_{PHICH}^{group}$, $n_{PHICH}^{seq}$). Here, $n_{PHICH}^{group}$ denotes a PHICH group number and $n_{PHICH}^{seq}$ denotes an orthogonal sequence index. $n_{PHICH}^{group}$ and $n_{PHICH}^{seq}$ are identified using the lowest physical RB (PRB) index from among PRB indices allocated for PUSCH transmission and a cyclic shift of a DMRS transmitted through a UG.

Equation 1 represents an example of obtaining $n_{PHICH}^{group}$ and $n_{PHICH}^{seq}$.

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA} / N_{PHICH}^{group} \rfloor + n_{DMRS}) \bmod 2N_{SF}^{PHICH}$$

[Equation 1]

Here, $n_{DMRS}$ is mapped from a DMRS field value (i.e. cyclic shift) in a UG PDCCH signal which is most recently received corresponding to PUSCH transmission. $N_{SF}^{PHICH}$ denotes the size of a spreading factor used for PHICH modulation. $N_{SF}^{PHICH}$ is 4 in group case of normal CP and 2 in case of extended CP. $N_{PHICH}^{group}$ represents the number of PHICH groups. $I_{PRB\_RA}$ corresponds to $I_{PRB\_RA}^{lowest\_index}$ for the first TB of a PUSCH and corresponds to $I_{PRB\_RA}^{lowest\_index}$ for the second TB of the PUSCH. $I_{PRB\_RA}^{lowest\_index}$ denotes the lowest PRB index (of the first slot) in PUSCH transmission. $I_{PHICH}$ is 1 for PUSCH transmission in a subframe n=4 or 9 in case of TDD UL-DL configuration #0 and 0 in other cases.

In case of FDD (frame structure type 1), the number of PHICH groups, $N_{PHICH}^{group}$, is identical in all subframes and given by Equation 2 in each subframe.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{[Equation 2]}$$

Here, $N_g \in \{1/6, 1/2, 1, 2\}$ is provided by a higher layer and $N_{RB}^{DL}$ denotes the number of RBs of a DL band.

In case of TDD (Frame structure type 2), the number of PHICH groups depends on DL subframe and is given by $m_i \cdot N_{PHICH}^{group}$. Table 6 shows $m_i$. A PHICH resource (or the quantity of PHICH resources) when $m_i=1$ is referred to as 1×PHICH resource and a PHICH resource (or the quantity of PHICH resources) when $m_i=2$ is referred to as 2×PHICH resource for convenience.

TABLE 6

| Uplink-downlink configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

Table 7 shows orthogonal sequences used to spread A/N bits.

TABLE 7

| | Orthogonal sequence | |
|---|---|---|
| Sequence index $n_{PHICH}^{seq}$ | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 12:
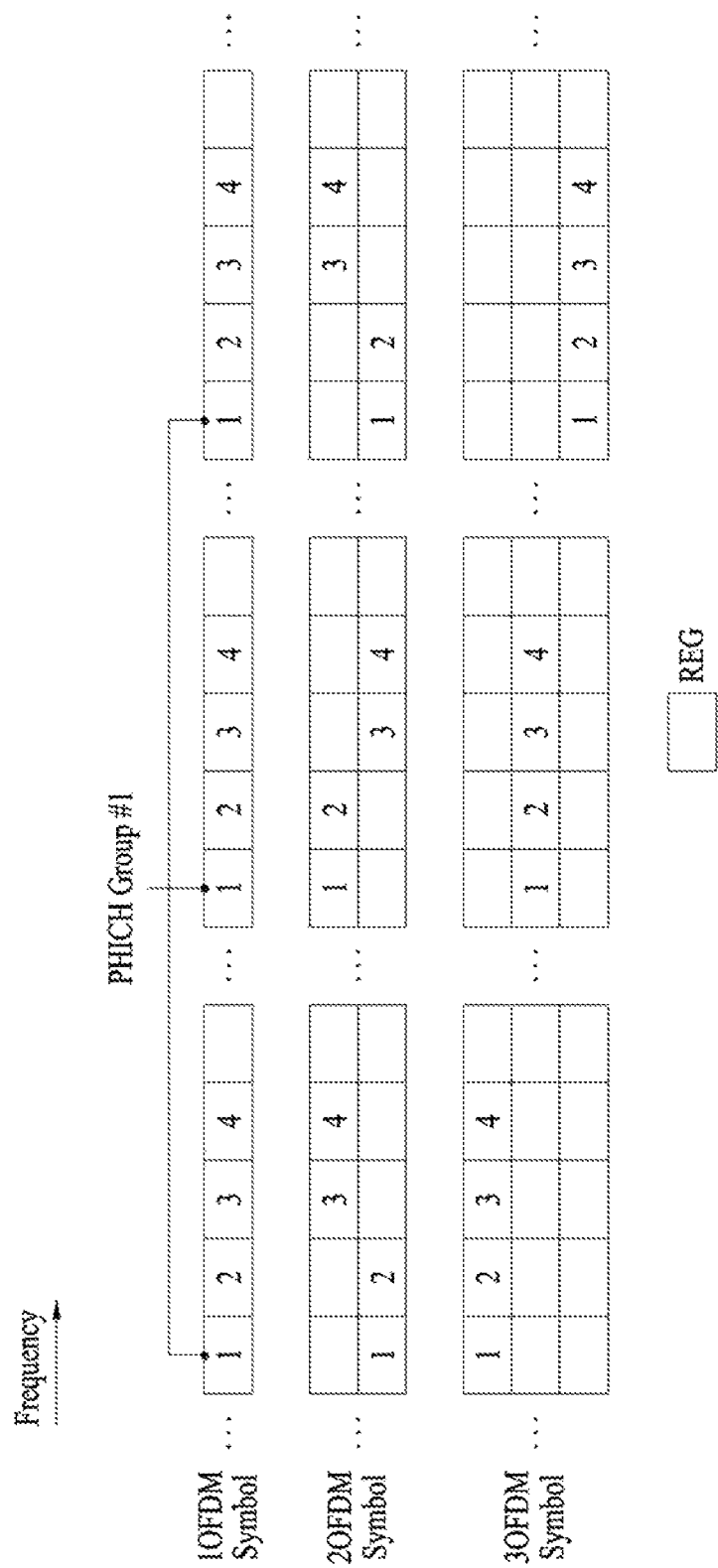
FIG. 12 illustrates an example of allocation of PHICHs in a control region.

FIG. 12 illustrates an example of allocation of PHICHs in a control region. PHICHs are mapped to REGs other than REGs corresponding to a PCFICH and RS (reference signal) in OFDMA symbols.

Referring to FIG. 12, a PHICH group is transmitted using 3 REGs spaced as far apart as possible in the frequency domain. Consequently, each bit of an A/N codeword is transmitted through each REG. PHICH groups are consecutively allocated in the frequency domain. In the figure, the same numeral denotes REGs belonging to the same PHICH group. A PHICH duration is limited by the size of the control region and the number of OFDM symbols (PHICH duration) used for PHICH transmission corresponds to one to three OFDMA symbols. When a plurality of OFDMA symbols is used for PHICH transmission, REGs belonging to the same PHICH group are transmitted using different OFDMA symbols.

A plurality of parallel HARQ processes for UL transmission is present for a UE. The parallel HARQ processes continuously perform UL transmission while the UE waits for HARQ feedback for successful or non-successful reception with respect to previous UL transmission. Each HARQ process is related to a HARQ buffer of a medium access control (MAC) layer. Each HARQ process manages state variables with respect to the number of transmissions of a MAC PDU (physical data block) in the buffer, HARQ feedback for the MAC PDU in the buffer, redundancy version (RV), etc. In addition, the HARQ process is related to a soft buffer for TBs and a soft buffer for code blocks in a physical layer PHY.

In case of LTE(-A) FDD, the number of UL HARQ processes for non-subframe bundling operation (i.e. normal HARQ operation) is 8. Since the number of UL subframes depends on UL-DL configuration in case of LTE(-A) TDD, the number of UL HARQ processes and HARQ RTT (round trip time) depend on UL-DL configuration. Here, the HARQ RTT may refer to an interval (e.g. in the unit of SF or ms) from when a UL grant is received, then via transmission of a PUSCH (corresponding to the UL grant), to when a PHICH (corresponding to the UL grant) is received or interval from PUSCH transmission timing to retransmission timing. When subframe bundling is applied, a PUSCH group composed of four consecutive UL subframes is transmitted in FDD and TDD. Accordingly, a HARQ operation/process when subframe bundling is applied differs from the normal HARQ operation/process.

Table 8 shows the maximum number of DL HARQ processes according to UL-DL configuration in TDD.

TABLE 8

| TDD UL-DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

Table 9 shows the number of synchronous UL HARQ processes and HARQ RTT in TDD. The number of UL SFs is defined per UL-DL Cfg, and the number of UL HARQ processes and the (UL) HARQ RTT are set according to UL-DL configuration on the basis of the number of UL SFs per UL-DL Cfg. The HARQ RTT may refer to an interval (e.g. in the unit of SF or ms) from when a UL grant is received, then via transmission of a PUSCH (corresponding to the UL grant), to when a PHICH (corresponding to the UL grant) is received or interval from PUSCH transmission timing to retransmission timing. When the UL HARQ RTT is 10 [SFs or ms] (UL-DL configurations #1, #2, #3, #4 and #5), one UL HARQ process uses one fixed UL SF timing. When the UL HARQ RTT is not 10 [SFs or ms] (UL-DL configurations #0 and #6), one UL HARQ process uses a plurality of UL SF timings (while hopping the same). For example, in case of UL-DL configuration #6, PUSCH transmission timing in a UL HARQ process may be: SF #2: PUSCH=>SF #13: PUSCH (RTT: 11 SFs)=>SF #24: PUSCH (RTT: 11SFs)=>SF #37: PUSCH (RTT: 13 SFs)=>SF #48: PUSCH (RTT: 11SFs)=>SF #52: PUSCH (RTT: 14 SFs).

TABLE 9

| UL-DL configuration | Number of UL SFs | Number of HARQ processes for normal HARQ operation | HARQ RTT |
|---|---|---|---|
| 0 | 6 | 7 | 11 or 13 |
| 1 | 4 | 4 | 10 |

TABLE 9-continued

| UL-DL configuration | Number of UL SFs | Number of HARQ processes for normal HARQ operation | HARQ RTT |
|---|---|---|---|
| 2 | 2 | 2 | 10 |
| 3 | 3 | 3 | 10 |
| 4 | 2 | 2 | 10 |
| 5 | 1 | 1 | 10 |
| 6 | 5 | 6 | 11 or 13 or 14 |

When a UL grant PDCCH and/or a PHICH are detected from a subframe n in case of TDD UL-DL configurations #1 to #6 and normal HARQ operation, the UE transmits a corresponding PUSCH signal in a subframe n+k (refer to Table 4) according to PDCCH and/or PHICH information.

When a UL DCI grant PDCCH and/or a PHICH are detected from a subframe n in case of TDD UL-DL configuration #0 and normal HARQ operation, PUSCH transmission timing of the UE depends on the situation. When the MSB (most significant bit) of a UL index in DCI is 1 or the PHICH is received through a resource corresponding to $I_{PHICH}=0$ in subframe #0 or #5, the UE transmits the corresponding PUSCH signal in the subframe n+k (refer to Table 4). When the LSB (least significant bit) of the UL index in the DCI is 1, the PHICH is received through a resource corresponding to $I_{PHICH}=1$ in subframe #0 or #5, or the PHICH is received through subframe #1 or #6, the UE transmits the corresponding PUSCH signal in a subframe n+7. When the MSB and LSB in the DCI are both set, the UE transmits the corresponding PUSCH signal in the subframe n+4 (refer to Table 4) and the subframe n+7.

A description will be given of operations of a HARQ entity and HARQ process in more detail with reference to 3GPP TS 36.321 V10.5.0 (2012-03) opened before initial provisional application of the present invention.

Tables 10 and 11 show operations of the HARQ entity and HARQ process.

TABLE 10

For each TTI, the HARQ entity shall:
identify the HARQ process(es) associated with this TTI, and for each identified HARQ process
    if an uplink grant has been indicated for this process and this TTI:
        if the received grant was not addressed to a Temporary C-RNTI on PDCCH and if the NDI provided in the associated HARQ information has been toggled compared to the value in the previous transmission of this HARQ process; or
        if the uplink grant was received on PDCCH for the C-RNTI and the HARQ buffer of the identified process is empty; or
        if the uplink grant was received in a Random Access Response:
            if there is a MAC PDU in the Msg3 buffer and the uplink grant was received in a Random Access Response:
                obtain the MAC PDU to transmit from the Msg3 buffer.
            else:
                obtain the MAC PDU to transmit from the "Multiplexing and assembly" entity;
            deliver the MAC PDU and the uplink grant and the HARQ information to the identified HARQ process;
            instruct the identified HARQ process to trigger a new transmission.
        else:
            deliver the uplink grant and the HARQ information (redundancy version) to the identified HARQ process;
            instruct the identified HARQ process to generate an adaptive retransmission.
    else, if the HARQ buffer of this HARQ process is not empty:
        instruct the identified HARQ process to generate a non-adaptive retransmission.

TABLE 11

When the HARQ feedback is received for this TB, the HARQ process shall:
    set HARQ_FEEDBACK to the received value.
If the HARQ entity requests a new transmission, the HARQ process shall:
    set CURRENT_TX_NB to 0;
    set CURRENT_IRV to 0;
    store the MAC PDU in the associated HARQ buffer;
    store the uplink grant received from the HARQ entity;
    set HARQ_FEEDBACK to NACK;
    generate a transmission as described below.
If the HARQ entity requests a retransmission, the HARQ process shall:
    increment CURRENT_TX_NB by 1;
    if the HARQ entity requests an adaptive retransmission:
        store the uplink grant received from the HARQ entity;
        set CURRENT_IRV to the index corresponding to the redundancy version value provided in the HARQ information;
        set HARQ_FEEDBACK to NACK;
        generate a transmission as described below.
    else if the HARQ entity requests a non-adaptive retransmission:
        if HARQ_FEEDBACK = NACK:
            generate a transmission as described below.

NOTE:
When receiving a HARQ ACK alone, the UE keeps the data in the HARQ buffer.
NOTE:
When no UL-SCH transmission can be made due to the occurrence of a measurement gap, no HARQ feedback can be received and a non-adaptive retransmission follows.

Figure 13:
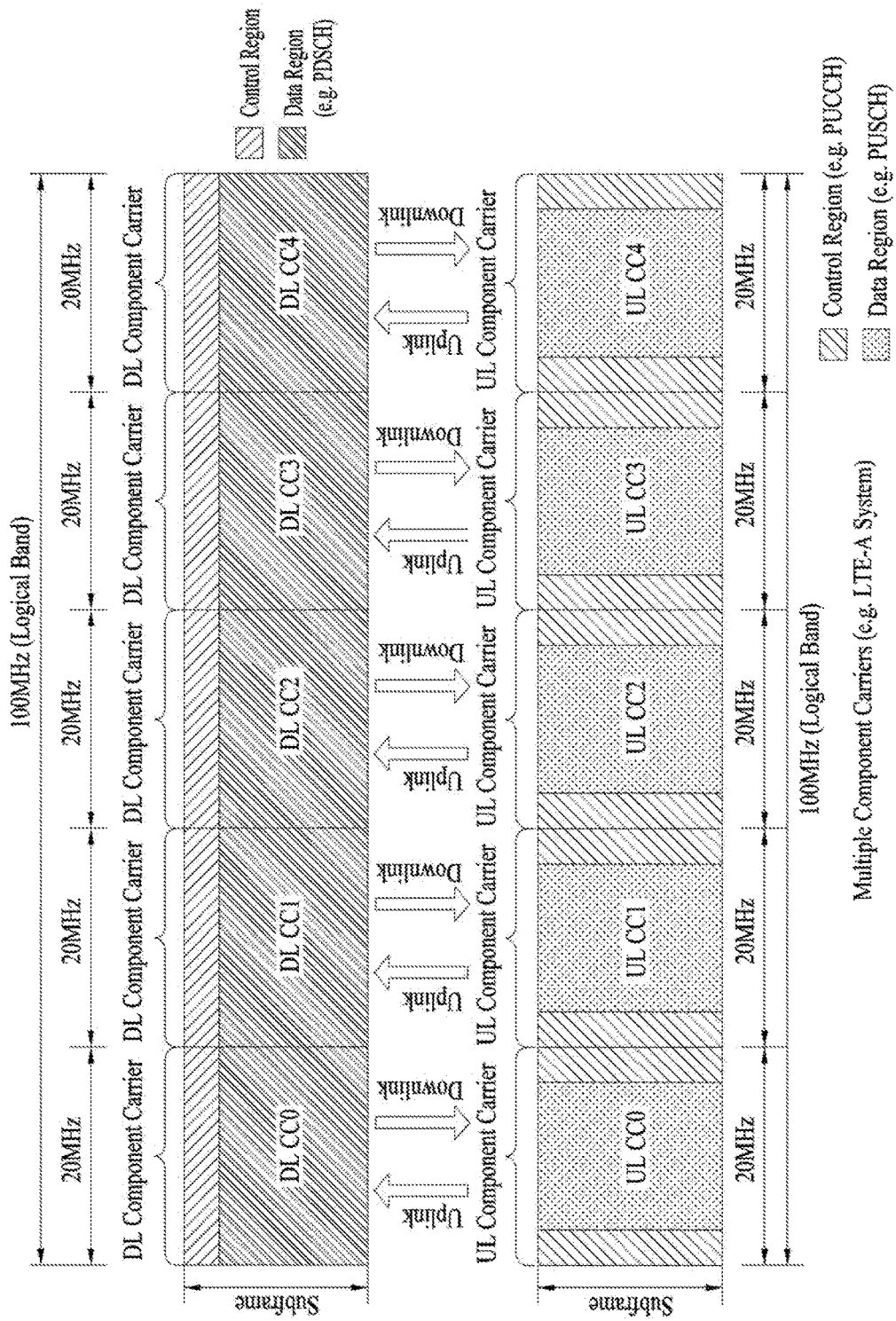
FIG. 13 illustrates a CA-based wireless communication system.

FIG. 13 illustrates a carrier aggregation (CA)-based wireless communication system. To use a wider frequency band, an LTE-A system employs CA which aggregates a plurality of UL/DL frequency blocks to obtain a wider UL/DL bandwidth although an LTE system supports only a single DL/UL frequency block. Each frequency block is transmitted using a component carrier (CC). The CC may be regarded as a carrier frequency (or center carrier, center frequency) for the frequency block.

Referring to FIG. 13, according to CA, a plurality of UL/DL CCs can be aggregated to support a wider UL/DL bandwidth. The CCs may be contiguous or non-contiguous in the frequency domain. Bandwidths of the CCs can be independently determined Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link may be fixed or semi-statically configured in the system. Even if the system bandwidth is configured with N CCs, a frequency band that a specific UE can use may be limited to L (<N) CCs. Various parameters with respect to CA may be set cell-specifically, UE-group-specifically, or UE-specifically. Control information may be transmitted/received only through a specific CC. This specific CC may be referred to as a primary CC (PCC) (or anchor CC) and other CCs can be referred to as secondary CCs (SCCs).

In LTE-A, the concept of a cell is used to manage radio resources. A cell is defined as a combination of DL resources and UL resources. Yet, the UL resources are not mandatory. Therefore, a cell may be composed of DL resources only or both DL resources and UL resources. The linkage between the carrier frequencies (or DL CCs) of DL resources and the carrier frequencies (or UL CCs) of UL resources may be indicated by system information when CA is supported. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and one or more SCells, for a UE in an RRC_CONNECTED state, for which CA is set.

The above description (FIGS. 1 to 13) is applicable to each CC (or cell) when a plurality of CCs (or cells) is aggregated unless otherwise mentioned. In addition, a CC may be used interchangeably with a serving CC, a serving carrier, a cell, a serving cell, etc.

When a plurality of CCs is configured, cross-CC scheduling and non-cross-CC scheduling may be used. Non-cross-CC scheduling corresponds to scheduling in LTE. When cross-CC scheduling is applied, a DL grant PDCCH may be transmitted on DL CC#0 and a PDSCH corresponding thereto may be transmitted on DL CC#2. Similarly, a UL grant PDCCH may be transmitted on DL CC#0 and a PUSCH corresponding thereto may be transmitted on DL CC#4. For cross-CC scheduling, a carrier indicator field (CIF) is used. Presence or absence of a CIF in a PDCCH may be semi-statically and UE-specifically (or UE-group-specifically) configured through higher layer signaling (e.g. RRC signaling).

Scheduling according to the CIF may be arranged as follows.
  CIF disabled: a PDCCH on a DL CC is used to allocate a PDSCH resource on the same DL CC or a PUSCH resource on a linked UL CC.
  CIF enabled: a PDCCH on a DL CC can be used to allocate a PDSCH or PUSCH resource on a specific DL/UL CC from among a plurality of aggregated DL/UL CCs using the CIF.

When the CIF is present, the BS may allocate a monitoring DL CC to reduce blind detection complexity of the UE. For PDSCH/PUSCH scheduling, the UE may detect/decode a PDCCH only on the corresponding DL CCs. In addition, the BS may transmit a PDCCH only through the monitoring DL CC (set). The monitoring DL CC set may be UE-specifically, UE-group-specifically or cell-specifically configured.

Figure 14:
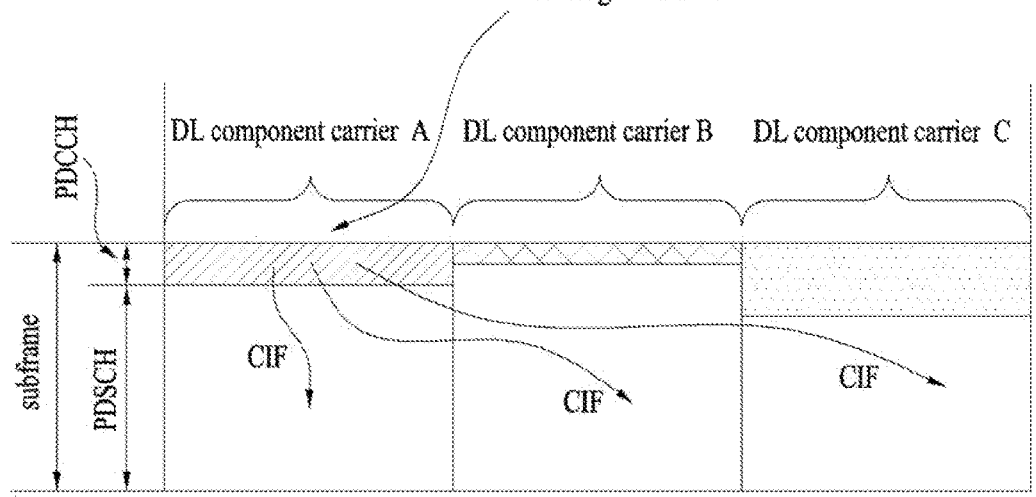
FIG. 14 illustrates a scheduling method when a plurality of cells is configured.

FIG. 14 illustrates cross-carrier scheduling. While the figure shows DL scheduling, cross-carrier scheduling is equally applied to UL scheduling.

Referring to FIG. 14, 3 DL CCs are configured for a UE, and DL CC A may be set as a PDCCH monitoring DL CC. When the CIF is disabled, each DL CC can transmit only a PDCCH that schedules a PDSCH corresponding to the DL CC without a CIF according to LTE PDCCH rule. When the CIF is enabled, DL CC A (i.e. MCC) can transmit not only a PDCCH that schedules the PDSCH corresponding to the DL CC A but also PDCCHs that schedule PDSCHs of other DL CCs using the CIF. In this case, a PDCCH is not transmitted in DL CC B/C.

Here, a specific CC (or cell) used to transmit scheduling information (e.g. PDCCH) is referred to as "monitoring CC (MCC)" which may be replaced by "monitoring carrier", "monitoring cell", "scheduling carrier", "scheduling cell", "scheduling CC", etc. A DL CC on which a PDSCH corresponding to a PDCCH is transmitted and a UL CC on which a PUSCH corresponding to a PUCCH is transmitted may be referred to as a scheduled carrier, a scheduled CC, a scheduled cell, etc. One or more scheduling CCs may be configured per UE. A scheduling CC may include a PCC. When only one scheduling CC is configured, the scheduling CC may be the PCC. The scheduling CC may be UE-specifically, UE-group-specifically or cell-specifically set.

In case of cross-CC scheduling, signal transmission may be performed as follows.
  PDCCH (UL/DL grant): scheduling CC (or MCC)
  PDSCH/PUSCH: CC indicated by a CIF of a PDCCH detected from a scheduling CC
  DL ACK/NACK (e.g. PHICH): scheduling CC (or MCC) (e.g. DL PCC)
  UL ACK/NACK (e.g. PUCCH): UL PCC
  * In the following description, DL ACK/NACK may be referred to as DL A/N or PHICH and UL ACK/NACK may be referred to as UL A/N or A/N for convenience.

Figure 15:
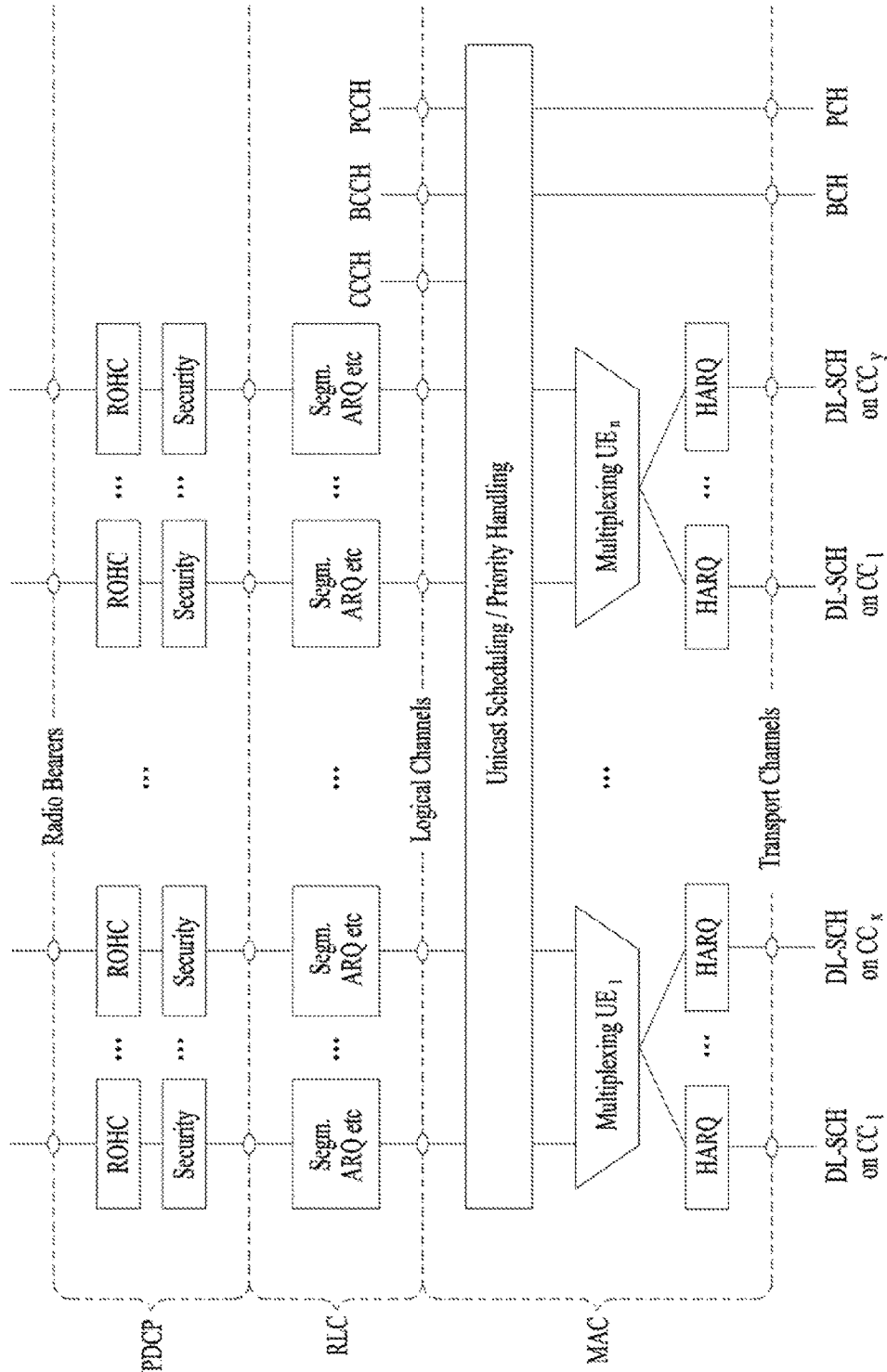
FIGS. 15 and 16 illustrate the second layer structures in case of CA.
Figure 16:
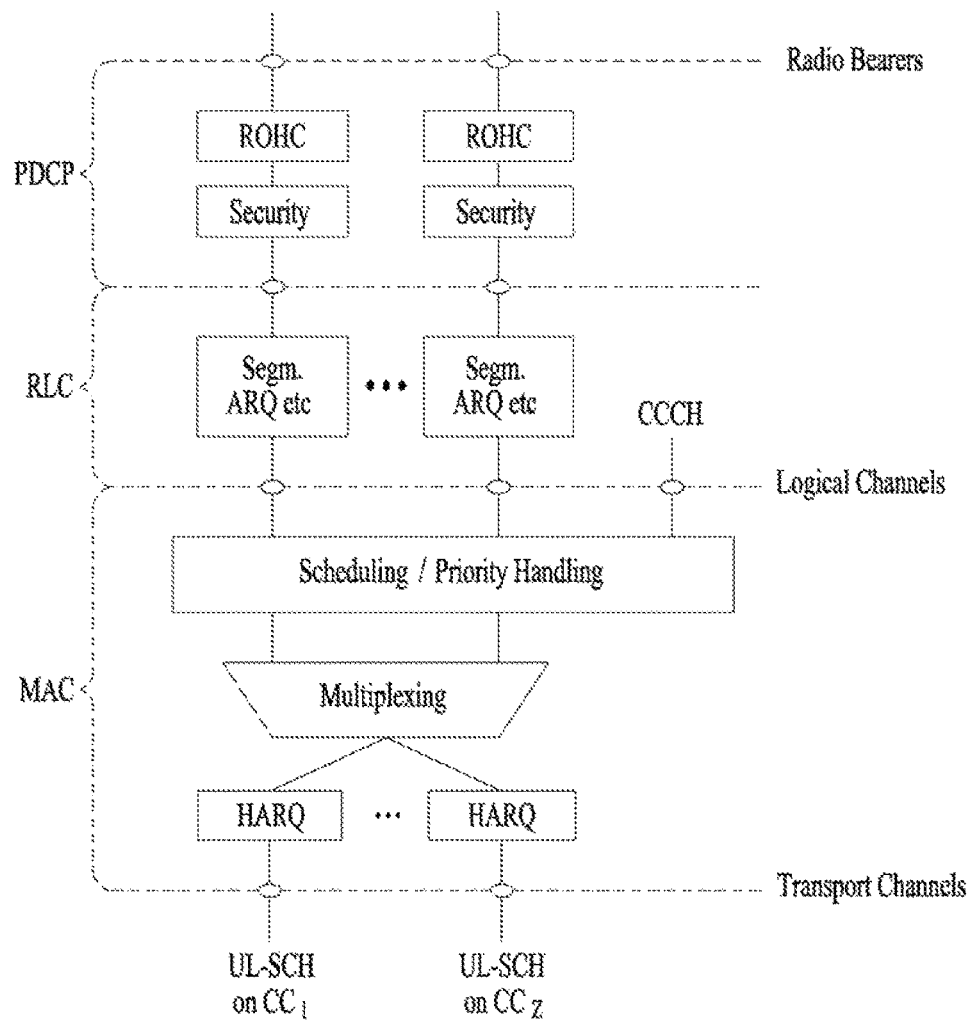

FIGS. 15 and 16 illustrate second layer (Layer 2) structures. A first layer (i.e. physical layer (PHY)) is present under the second layer and a third layer (e.g. RRC layer) is present above the second layer. FIG. 15 shows the second layer structure of the BS and FIG. 16 shows the second layer structure of the UE. CA considerably affects the MAC layer of the second layer. For example, the MAC layer of a CA system performs operation related to a plurality of HARQ entities since a plurality of CCs is aggregated in CA and one HARQ entity (HARQ block in the figures) manages one CC.

HARQ entities independently process TBs, and thus a plurality of TBs can be transmitted or received through a plurality of CCs at the same time. Each HARQ entity manages operations of a plurality of HARQ processes (HARQp).

Embodiment: A/N Transmission when CCs Having Different Subframe Configurations are Aggregated A conventional CA TDD system considers only a case in which a plurality of serving cells (e.g. PCell and SCell) having the same TDD UL-DL configuration is aggregated. However, a beyond LTE-A system considers aggregation of a plurality of CCs having different subframe configurations. For example, aggregation of a plurality of CCs having different subframe configurations includes aggregation of a plurality of CCs having different UL-DL configurations (referred to as different TDD CA for convenience) and aggregation of TDD CC and FDD CC. While the following description is based on different TDD CA, aggregation of a plurality of CCs having different subframe configurations is not limited thereto. In the case of different TDD CA, A/N timings (refer to FIGS. 5 and 6) configured for a PCC and SCC may differ from each other according to UL-DL configurations thereof. Accordingly, different UL SF timings at which A/N is transmitted may be configured for the PCC and SCC for the same DL SF timing and different DL SF groups to which A/N feedback is transmitted at the same UL SF timing may be configured for the PCC and SCC. In addition, link directions (i.e. DL/UL) of the PCC and SCC may differ from each other for the same SF timing.

Furthermore, the beyond LTE-A system considers supporting of cross-CC scheduling operation even when a plurality of CCs having different subframe configurations is aggregated. In this case, UL grant/PHICH timings (refer to FIGS. 7 to 10) configured for an MCC and SCC may differ from each other. For example, different DL SFs in which a UL grant/PHICH is transmitted may be set for the MCC and SCC for the same UL SF. In addition, for a UL grant or PHICH feedback transmitted in the same DL SF, different UL SF groups may be set for the MCC and SCC. Even in this case, link directions of the MCC and SCC may differ from each other for the same SF timing. For example, specific SF timing may be set to a DL SF in which a UL grant/PHICH will be transmitted for the SCC whereas such SF timing may be set to a UL SF for the MCC.

When SF timing (referred to as a collided SF hereinafter) at which link directions of the PCC (or MCC) and SCC are different from each other is present due to different subframe configurations (e.g. different TDD CA), only a CC having a specific link direction or the same link direction as a specific CC (e.g. PCC (or MCC)) between the PCC (or MCC) and SCC may be operated at the SF timing due to UE hardware configuration or for other reasons/purposes. Such scheme is referred to as half-duplex (HD)-TDD CA for convenience. For example, when a specific SF timing with respect to the PCC (or MCC) is set to a DL SF and the SF timing with respect to the SCC is set to a UL SF to generate a collided SF, only the PCC (or MCC) (i.e. DL SF set to the PCC (or MCC)) having a DL direction at the corresponding SF timing may be operated and the SCC (i.e. UL SF set to the SCC)) having a UL direction at the SF timing may not be operated (and vice versa).

Figure 17:
FIG. 17 illustrates half duplex (HD)-TDD CA.

In this case, to transmit a UG/PHICH for UL data transmitted through an MCC UL SF and an SCC UL SF cross-CC-scheduled through the MCC, the same or different UG/PHICH timing (set to a specific UL-DL configuration) may be applied per CC or UG/PHICH timing configured as the specific UL-DL configuration may be commonly applied to all CCs (i.e. PCC (or MCC) and SCC). The specific UL-DL configuration (referred to as a reference configuration (Ref-Cfg), hereinafter) may correspond to a UL-DL configuration (MCC-Cfg) set to the PCC (or MCC) or a UL-DL configuration (SCC-Cfg) set to the SCC or may be determined as a UL-DL configuration other than MCC-Cfg and SCC-Cfg. FIG. 17 illustrates HD-TDD CA. In the figure, a shaded portion X represents a CC (link direction) which is restricted to be used in the collided SF.

Figure 18:
FIG. 18 illustrates full duplex (FD)-TDD CA.

A method of permitting simultaneous UL/DL transmission/reception in the collided SF in which link directions of the PCC (or MCC) and SCC differ from each other may be considered. Such method is referred to as full duplex (FD)-TDD CA for convenience. In this case, to transmit a UG/PHICH for a UL SF of the PCC (or MCC) and a UL SF of the SCC, which is cross-CC-scheduled through the PCC (or MCC), through the PCC (or MCC), the same or different UG/PHICH timing (set to a specific UL-DL configuration (i.e. Ref-Cfg)) may be applied or UG/PHICH timing configured as the specific UL-DL configuration (i.e. Ref-Cfg) may be commonly applied to all CCs (i.e. PCC (or MCC) and SCC). Ref-Cfg may correspond to MCC-Cfg or SCC-Cfg or may be determined as UL-DL Cfg other than MCC-Cfg and SCC-Cfg. FIG. 18 illustrates FD-TDD CA.

In the specification, D denotes a DL SF or a specific SF and U represents a UL SF. When a UL-DL configuration (UD-cfg) of a CC is (semi-)statically set through broadcast information or higher layer signaling, a subframe configuration of the CC may be determined on the basis of Table 1. A/N timing may refer to U configured to transmit/receive A/N for DL data of a specific D or timing relationship thereof. UG or PHICH timing may refer to D configured to transmit/receive a UG that schedules UL data of a specific U and a PHICH for transmission of the UL data or timing relationship thereof. Specifically, application of ACK/NACK timing set to a specific CC (i.e. Ref-CC) or specific UD-Cfg (i.e. Ref-cfg) may refer to use of UD-Cfg of the specific CC or a parameter value corresponding to the specific UD-Cfg in Table 3. In addition, application of UL grant or PHICH timing set to the specific CC (i.e. Ref-CC) or specific UD-cfg (i.e. Ref-cfg) may refer to use of UD-Cfg of the specific CC or a parameter value corresponding to the specific UD-cfg in Tables 4 and 5.

In the present invention, Ref-Cfg for a UL data HARQ process (i.e. UG or PHICH timing) may be determined as follows according to whether cross-CC scheduling is applied or not.

[Solution 1]

UL grant/PHICH for UL data transmitted through the MCC
  UL grant/PHICH timing set to the MCC is applied.
UL grant/PHICH for UL data transmitted through the SCC
  Non-cross-CC scheduling: UL grant/PHICH timing set to the SCC is applied.
  Cross-CC scheduling: UL grant/PHICH timing (referred to as UL union timing hereinafter) of a UL-DL configuration (referred to as UL union hereinafter) having the smallest number of Us from among UL-DL configurations in which SFs, where MCC or SCC is U, are all set to U is applied. Equivalently, UL grant/PHICH timing of a UL-DL configuration (i.e. UL union) having the largest number of Ds from among UL-DL configurations in which SFs, where MCC or SCC is U, are all set to U is applied.

[Solution 2]

UL grant/PHICH for UL data transmitted through the MCC

UL grant/PHICH timing set to the MCC is applied.

UL grant/PHICH for UL data transmitted through the SCC

Non-cross-CC scheduling: UL grant/PHICH timing set to the SCC is applied.

Cross-CC scheduling: UL grant/PHICH timing set to the MCC is applied. Scheduling of U of the SCC may be abandoned for a collided SF in which the MCC (and/or PCC) corresponds to D and the SCC corresponds to U (i.e. the collided SF is excluded from available U (in terms of UL grant/PHICH)). Accordingly, UL grant/PHICH timing may not be defined for the collided SF. Therefore, the collided SF may not be considered for the number of HARQ processes, HARQ RTT determination, etc. or may be processed as NACK (or DTX or NACK/DTX).

UL-DL configuration #0 in which the number of UL SFs is greater than the number of DL SFs has characteristics different from other DL-UL configurations. For example, a UL DAI (downlink assignment index) is included in a UL grant DCI format in the case of UL-DL configurations #1 to #6, whereas a UL index rather than the UL DAI is included in the UL grant DCI format in the case of UL-DL configuration #0. Here, the UL index indicates a UL SF to be scheduled. That is, in the case of UL-DL configuration #0, the UL index is used in order to perform UL data scheduling/HARQ process for a large number of UL SFs using a small number of DL SFs. In the case of UL-DL configurations #1 to #6, a DL DAI in a DL grant DCI format indicates a PDCCH order value (or counter value). In the case of UL-DL configuration #0, the DL DAI is not signaled while the DL DAI is included in the DL grant DCI format. DL DAI signaling may be omitted in the case of UL-DL configuration #0 since the number of UL SFs is greater than the number of DL SFs and thus different UL SFs can be linked to DL SFs (for A/N transmission). Here, the DL grant DCI format may include not only a PDCCH that schedules DL data but also a PDCCH that orders SPS release.

Accordingly, UD-Cfg #0 permits an operation through which a single UL grant PDCCH simultaneously schedules a plurality of (e.g. 2) pieces of UL data, which are respectively transmitted through a plurality of (e.g. 2) UL SFs, unlike other UD-Cfgs. In view of this, a larger amount (e.g. twice) of PHICH resources is reserved in a specific DL SF, compared to a normal case.

Specifically, referring back to Equation 1 and Table 6, when PHICHs with respect to two UL SFs (UL data transmitted through the UL SFs) are simultaneously transmitted in specific DL SFs (e.g. DL SFs #0 and #5), the PHICH resource index corresponding to the first UL SF (chronologically) may be determined as a PHICH resource index obtained by applying $I_{PHICH}=0$ to Equation 1 and the PHICH resource index corresponding to the second UL SF may be determined as a PHICH resource index obtained by applying $I_{PHICH}=1$ to Equation 1. Equation 1 is shown below for convenience.

$$n_{PHICH}^{group}=(I_{PRB\_RA}+n_{DMRS}) \bmod N_{PHICH}^{group}+I_{PHICH}N_{PHICH}^{group}$$

$$n_{PHICH}^{seq}=(\lfloor I_{PRB\_RA}/N_{PHICH}^{group}\rfloor+n_{DMRS}) \bmod 2N_{SF}^{PHICH}$$

When the SCC is set to UD-Cfg #0 and the MCC is set to UL-Cfg other than UD-Cfg #0 in case of cross-CC scheduling, solution 1 is applicable. When solution 1 is applied, Ref-Cfg of UG/PHICH timing for UL data (SCC UL data) (e.g. SCC PUSCH) transmitted through the SCC may be determined as a UL union of the MCC and SCC, UD-Cfg #0 (i.e. SCC UD-Cfg). Here, a PHICH for the SCC UL data is transmitted from the MCC since cross-CC scheduling is used and only 1×PHICH resource is reserved in a DL SF since the MCC does not correspond to UD-Cfg #0. Accordingly, when transmission of PHICHs for two SCC UL SFs needs to be performed in a single MCC DL SF, the conventional PHICH resource determination and transmission scheme cannot be used.

To solve the aforementioned problem, the present invention proposes a method of determining a PHICH resource transmitting a PHICH signal for A/N feedback for SCC UL data when SCC UD-Cfg corresponds to UD-Cfg #0 in case of TDD CA based cross-CC scheduling between different UD-Cfgs. To understand the present invention, it is assumed that Ref-Cfg of UG/PHICH timing for UL data transmitted through an SCC corresponding to UD-Cfg #0 is determined as UD-Cfg #0 (i.e. SCC UD-Cfg) according to solution 1 in the proposed method. The method proposed by the present invention may be generalized as a method of determining and transmitting a PHICH resource corresponding to SCC UL data when UD-Cfg of MCC does not correspond to UD-Cfg #0 (e.g. MCC UD-Cfg=UD-Cfgs #1 to #6; MCC=FDD CC) and Ref-Cfg of UG/PHICH timing for the SCC is set to UD-Cfg #0. The method is applicable even when a plurality of SCCs is present and may be used for MCC/SCC combinations.

Specifically, when a DL SF of the MCC, which corresponds to common PHICH timing for two specific UL SFs (two pieces of UL data transmitted through the UL SFs) on the SCC, belongs to UG/PHICH timing (e.g. a DL SF in which a PHICH resource is reserved) set to the MCC (i.e. when PHICH resource allocation and transmission for two pieces of UL data are simultaneously needed while only 1×PHICH resource is reserved), the following PHICH resource allocation and transmission method is provided. The two pieces of UL data are respectively referred to as UL SF-1 and UL SF-2 and it is assumed that UL SF-1 precedes UL SF-2.

Alt 0) $I_{PHICH}=0$ is Applied to all UL SFs to Obtain PHICH Resource Index

When PHICH resources corresponding to UL SF-1 and UL SF-2 are determined (refer to Equation 1), $I_{PHICH}=0$ is applicable to both UL SF-1 and UL SF-2. Specifically, a PHICH resource index corresponding to UL SF-1 may be assigned a PHICH resource index linked to the lowest PRB index (and a DMRS CS value related to UL data transmission) with respect to a UL data transmission resource region in UL SF-1 on the basis of $I_{PHICH}=0$. A PHICH resource index corresponding to UL SF-2 may be assigned a PHICH resource index linked to the lowest PRB index (and a DMRS CS value related to UL data transmission) with respect to a UL data transmission resource region in UL SF-2 on the basis of $I_{PHICH}=0$. When the SCC is set to a mode in which transmission of a maximum of two TBs is supported in one UL SF, the PHICH resource index corresponding to the first TB of UL SF-1 (or UL SF-2) may be determined as a PHICH resource index $I_{PHICH}=0$ linked to the lowest PRB index $k_{PRB}$ (and a DMRS CS value related to UL data transmission) used for UL data transmission in UL SF-1 (or UL SF-2) on the basis of $I_{PHICH}=0$ and the PHICH resource index corresponding to the second TB of UL SF-1 (or UL SF-2) may be determined as a PHICH resource index $n_{PHICH,1}$ linked to $k_{PRB}+1$ (and the DMRS CS value related to UL data transmission) on the basis of $I_{PHICH}=0$.

The aforementioned method may limit a case in which the lowest PRB index ($k_{PRB}$ and/or $k_{PRB}\pm1$ when SCC UL supports transmission of a maximum of two TBs) allocated to UL data transmitted through UL SF-1 and UL SF-2 and the DMRS CS value related thereto are identically assigned in UL SF-1 and UL SF-2 in order to avoid collision between PHICH resources corresponding to UL SF-1 and UL SF-2.

The method proposed by the present invention may equivalent to operations of determining $I_{PHICH}$ as defined for UD-Cfg #0, which is Ref-Cfg of UG/PHICH timing (i.e. $I_{PHICH}=1$ for UL data transmission of SFs #4 and #9 and $I_{PHICH}=0$ for UL data transmission of other SFs), and obtaining PHICH resource indices based on the following equations.

$$n_{PHICH}^{group}=(I_{PRB\_RA}+n_{DMRS}) \bmod N_{PHICH}^{group}$$

$$n_{PHICH}^{seq}=(\lfloor I_{PRB\_RA}/N_{PHICH}^{group}\rfloor+n_{DMRS}) \bmod 2N_{SF}^{PHICH} \quad \text{[Equation 3]}$$

In addition, the method proposed by the present invention may be equivalent to operations of determining $I_{PHICH}$ according to UD-Cfg #0, which is Ref-Cfg of UG/PHICH timing (i.e. $I_{PHICH}=1$ for UL data transmission of SFs #4 and #9 and $I_{PHICH}=0$ for UL data transmission of other SFs), and obtaining PHICH resource indices (i.e. PHICH group indices) based on one of the following equations.

$$n_{PHICH}^{group}=(I_{PRB\_RA}+n_{DMRS}) \bmod N_{PHICH}^{group}+I_{PHICH}N_{PHICH}^{group}+\text{offset}$$

$$n_{PHICH}^{group}=(I_{PRB\_RA}+n_{DMRS}) \bmod N_{PHICH}^{group}+(I_{PHICH}+\text{offset})N_{PHICH}^{group} \quad \text{[Equation 4]}$$

In the first equation, the offset may be set to $-N_{PHICH}^{group}$ (in the case of SFs #4 and #9) or 0 (in the case of other SFs). In the second equation, the offset may be set to −1 (in the case of SFs #4 and #9) or 0 (in the case of other SFs).

Alt 1) Setting of Offset for PHICH Resource Index (or DMRS CS)

A PHICH resource index corresponding to UL data of UL SF-1 may be determined as a PHICH resource index (e.g. $n_{PHICH}$) linked to the lowest PRB index (and the DMFS CS value) with respect to the UL data transmission region. A PHICH resource index corresponding to UL data of UL SF-2 may be determined as a PHICH resource index corresponding to $n_{PHICH}+\text{offset}$. Equivalently, a PHICH resource index corresponding to UL data of UL SF-2 may be determined as a PHICH resource index inferred from a DMRS CS value obtained by adding an offset to a value signaled through a DMRS CS field in a UG PDCCH (or a PHICH resource index inferred from a value obtained by adding an offset to a parameter used for PHICH resource index determination). Here, the offset may be pre-fixed or cell-/UE-specifically set through L1 (Layer 1)/L2 (Layer 2)/RRC (radio resource control)/broadcast signaling. Alternatively, the offset may not be applied when the PHICH resource index corresponding to UL SF-2 is determined, whereas the offset may be applied when the PHICH resource index corresponding to UL SF-1 is determined. The offset is preferably set to a non-zero value in consideration of PHICH resource collision.

When SCC UL is set to a mode supporting transmission of a maximum of two TBs, PHICH resources corresponding to the two TBs transmitted through UL SF-1 (or UL SF-2) may be determined as PHICH resources corresponding to PHICH resource indices $n_{PHICH,0}$ and $n_{PHICH,1}$ respectively linked to the lowest PRB index $k_{PRB}$ and $k_{PRB}+1$. PHICH resources corresponding to the two TBs transmitted through UL SF-2 (or UL SF-1) may be determined as PHICH resources corresponding to two PHICH resource indices inferred from a value obtained by adding an offset to $k_{PRB}$, $k_{PRB}+1$, DMRS CS or a parameter related to PHICH resource determination. Here, the offset may be set to a value that does not correspond to {−1, 0, 1} in consideration of PHICH resource collision.

Alt 2) Application of Operation of Permitting Only UL Grant Based Retransmission without Referring to PHICH In the case of UL data of UL SF-1, PHICH based non-adaptive retransmission (and UL grant reception based adaptive retransmission) may be permitted. Here, a PHICH resource corresponding to UL SF-1 may be determined as a PHICH resource corresponding to a PHICH resource index linked to the lowest PRB index (and the DMRS CS value) with respect to the UL data transmission resource region. When SCC UL is set to a mode supporting transmission of up to two TBs, PHICH resources corresponding to two TBs transmitted through UL SF-1 may be determined as PHICH resources corresponding to a PHICH resource index $n_{PHICH,0}$ linked to the lowest PRB index $k_{PRB}$ and a PHICH resource index $n_{PHICH,1}$ linked to $k_{PRB}+1$.

In the case of UL data of UL SF-2, a PHICH resource corresponding to the UL data may not be allocated thereto and only UL grant based adaptive retransmission may be permitted without referring to a PHICH (referred to as PHICH-less operation). To permit only UL grant based retransmission, a UE may transmit ACK to a HARQ entity (specifically, a HARQ process) of MAC layer in a DL SF in which a PHICH with respect to UL SF-2 needs to be received. UL data retransmission may be performed when NACK or DTX is detected because the MAC layer may determine that DTX is generated in UL data/PHICH when the UE reports no HARQ response to the MAC layer in the DL SF where the PHICH with respect to UL SF-2 needs to be received. When a UL grant is received in a DL SF through which the PHICH with respect to UL SF-2 needs to be received, the UE may perform retransmission/initial transmission of UL data according to a new data indicator (NDI) in the UL grant.

Conversely, the PHICH based scheme may be applied to UL SF-2 and the PHICH-less operation may be applied to UL SF-1. That is, in the case of UL SF-1, only UL grant based adaptive retransmission may be permitted without corresponding PHICH resource allocation and without reference thereto.

Figure 19:
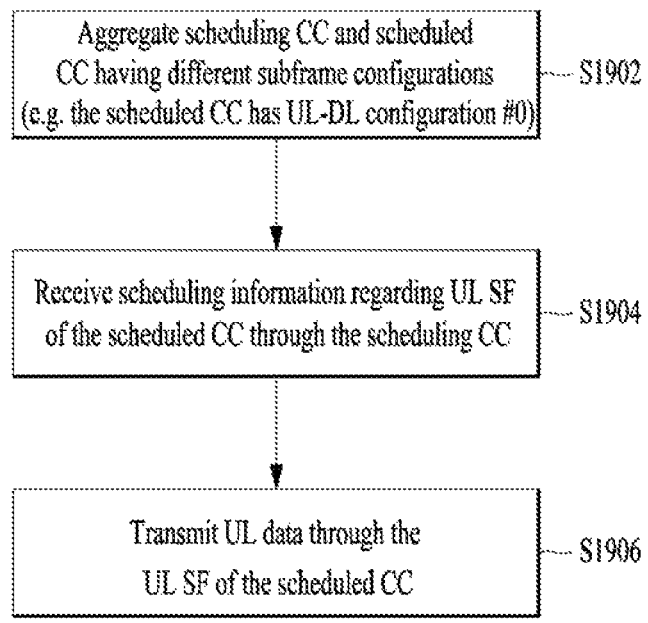
FIG. 19 illustrates a HARQ process according to an embodiment of the present invention.

FIG. 19 illustrates a generalized example of the HARQ process according to Alt 2. While the figure shows UE operation for convenience, it is apparent that an eNB can perform a corresponding operation.

Referring to FIG. 19, the UE aggregates a plurality of CCs (S1902). Here, the CCs may have different subframe configurations (e.g. CCs having different TDD UL-DL configurations are aggregated or a TDD CC and an FDD CC are aggregated). For example, a scheduling CC and a scheduled CC may be aggregated and the scheduled CC may have UL-DL configuration #0. Then, the UE may receive scheduling information (UL grant PDCCH) on a UL SF of the scheduled CC through the scheduling CC (S1904). When the scheduled CC has UL-DL configuration #0, the UL grant PDCCH may include scheduling information on UL SF-1 and/or UL SF-2. UL SF-1 precedes UL SF-2. Resource allocation with respect to UL SF-1 and/or UL SF-2 may be indicated using a UL index in the UL grant PDCCH. Then, the UE may transmit UL data through the UL SF of the scheduled CC according to the scheduling information (S1906). According to the method proposed by the present invention, when a PHICH resource corresponding to the UL SF is present in a DL SF of the scheduling CC, which corresponds to the UL SF (e.g. in the case of UL SF-1), PHICH-based retransmission and/or UL grant-based retransmission are permitted for data of the UL SF. On the contrary, when the PHICH resource corresponding to the UL SF is not present in the DL SF of the scheduling CC, which corresponds to the UL SF (e.g. in the case of UL SF-2), only UL grant-based retransmission may be permitted for the data of the UL SF.

Alt 2-1) Application of Operation of Permitting Only UL Grant Based Retransmission without Reference to PHICH PHICH resources corresponding to UL data of UL SF-1 and UL data of UL SF-2 may not allocated thereto and only UL grant based adaptive retransmission may be permitted without referring to a PHICH. That is, the PHICH-less operation is applicable to both UL SF-1 and UL SF-2.

Alt 3) Transmission of ACK/NACK Bundled Per UL SF/Between UL SFs Through a Single PHICH Resource Bundling (e.g. logical AND operation) may be performed on A/N for UL data of UL SF-1 and A/N for UL data of UL SF-2 and then the bundled A/Ns may be transmitted through a single PHICH resource. The PHICH resource may be determined as a PHICH resource corresponding to a PHICH resource index linked to the lowest PRB index (and the DMRS CS value) with respect to the UL data transmission resource region of UL SF-1 (or UL SF-2).

When the SCC UL is set to a mode supporting transmission of up to two TBs, it is possible to use PHICH resource index $n_{PHICH,0}$ linked to the lowest PRB index $k_{PRB}$ of the UL data transmission resource region of a specific UL SF (UL SF-1 or UL SF-2) and PHICH resource index $n_{PHICH,1}$ linked to $k_{PRB}+1$. In addition, it is possible to use PHICH resource index $n_{PHICH,U1}$ linked to the lowest PRB index $k_{PRB,U1}$ of the UL data transmission resource region of UL SF-1 and PHICH resource index $n_{PHICH,U2}$ linked to the lowest PRB index $k_{PRB,U2}$ of the UL data transmission resource region of UL SF-2. On the basis of this, it is possible to consider a method of i) transmitting/receiving bundled ACK/NACK for UL SF-1 TBs through $n_{PHICH,0}$ (or $n_{PHICH,U1}$) or transmitting/receiving ACK/NACK for UL SF-2 TBs through $n_{PHICH,1}$ (or $n_{PHICH,U2}$) or ii) transmitting/receiving bundled ACK/NACK for the first TB transmitted through the two UL SFs by means of $n_{PHICH,0}$ (or $n_{PHICH,U1}$) and transmitting/receiving bundled ACK/NACK for the second TB through $n_{PHICH,1}$ (or $n_{PHICH,U2}$).

When a DL SF of the MCC, which corresponds to common PHICH timing for two specific UL SFs (specifically, two pieces of UL data transmitted through the UL SFs) on the SCC, does not belong to UG/PHICH timing (e.g. DL SF in which a PHICH resource is reserved) set to the MCC (i.e. when PHICH resource allocation and transmission for the two pieces of UL data are simultaneously required while there is no reserved PHICH resource), Alt 2-1 is applicable.

When the MCC corresponds to UL-Cfg #0 and the SCC is set to UD-Cfg other than UD-Cfg #0 in a cross-CC scheduling case, a method other than solution 1 or 2 is applicable. For example, Ref-Cfg of UG/PHICH timing for the SCC UL data may be determined as UD Cfg (which may include UD-Cfg of the SCC) (e.g. UD Cfg #1 or UD-Cfg #6) other than UD-Cfg #0 (corresponding to the UL union of the MCC and SCC or UD-Cfg of the MCC). That is, the aforementioned case may refer to a case in which UD-Cfg of the MCC is UD-Cfg #0 and Ref-Cfg of UG/PHICH timing for the SCC is not set to UD-Cfg #0. Here, 2×PHICH resource may be reserved in all or some DL SFs since the MCC corresponds to UD-Cfg #0. In this case, a PHICH with respect to a single SCC UL SF (UL data transmitted through the same) may be transmitted through a single MCC DL SF according to Ref-Cfg.

To achieve this, Alt 0 may be applied (i.e. PHICH resource indices are determined by applying $I_{PHICH}=0$ for all UL SFs (UL data transmitted through the same) of the SCC), $I_{PHICH}=0$ and $I_{PHICH}=1$ may be respectively applied to a case in which 1×PHICH resource is reserved and a case in which 2×PHICH resource is reserved, or $I_{PHICH}=0$ may be applied to the case in which 1×PHICH resource is reserved and it may be determined which one of $I_{PHICH}=0$ and $I_{PHICH}=1$ is applied to the case in which 2×PHICH resource is reserved. $I_{PHICH}$ may be semi-statically set through RRF signaling, for example, explicitly indicated by adding a (1-bit) field in the UL grant PDCCH, or implicitly linked to a specific field value in the UL grant PDCCH (e.g. $I_{PHICH}$ depends on RB allocation information and/or DMRS CS value).

Which one of the aforementioned methods (Alt 0 to Alt 3) is applied may be cell-specifically or UE-specifically set through RRC signaling.

When Alt 0 (applying $I_{PHICH}=0$) is employed, $I_{PHICH}$ (corresponding to UL data transmission in the SCC) may be determined according to UD-Cfg (i.e. MCC UD-Cfg) of the MCC and/or Ref-Cfg (i.e. SCC Ref-Cfg) of UG/PHICH timing for the SCC (limited to TDD CA of different UD-Cfgs).

Alt 0-1) Setting of $I_{PHICH}$ According to Whether MCC UD-Cfg or SCC Ref-Cfg Corresponds to UD-Cfg #0

When MCC UD-Cfg corresponds to UD-Cfg #0, $I_{PHICH}$ may be set to 0 or 1 according to SF. When MCC UD-Cfg is not UD-Cfg #0, $I_{PHICH}$ may be set to 0 for all SFs. In addition, $I_{PHICH}$ may be set to 0 or 1 according to SF when SCC Ref-Cfg is UD-Cfg #0 and set to 0 for all SFs when SCC Ref-Cfg is UD-Cfg #0.

Alt 0-2) Setting of $I_{PHICH}$ According to Whether Both MCC UD-Cfg and SCC Ref-Cfg Correspond to UD-Cfg #0

$I_{PHICH}$ may be set to 0 or 1 according to SF when both MCC UD-Cfg and SCC Ref-Cfg correspond to UD-Cfg #0 and set to 0 for all SFs (i.e. UL data transmission in all (UL) SFs) when at least one of MCC UD-Cfg and SCC Ref-Cfg does not correspond to UD-Cfg #0. Specifically, when both MCC UD-Cfg and SCC Ref-Cfg correspond to UD-Cfg #0, $I_{PHICH}$ may be set to 1 for UL data transmission in SFs #4 and #9 and set to 0 for UL data transmission in the remaining SFs.

When MCC UD-Cfg corresponds to UD-Cfg #0 whereas SCC Ref-Cfg does not correspond to UD-Cfg #0, 1) $I_{PHICH}$ may be set to 0 or 1 according to (UL data transmission) SF for the MCC and $I_{PHICH}$ may be set to 0 for all SFs with respect to the SCC or 2) $I_{PHICH}$ corresponding to all SFs may be set to 0 for both the MCC and SCC. When MCC UD-Cfg does not correspond to UD-Cfg #0, $I_{PHICH}$ corresponding to all (UL data transmission) SFs may be set to 0 for both the MCC and SCC (irrespective of SCC Ref-Cfg).

Alt 0-3) Setting of $I_{PHICH}$ Irrespective of Combination of MCC and SCC $I_{PHICH}$ may be set to 0 for all SFs (i.e. UL data transmission in all (UL) SFs) all the time irrespective of a combination of the MCC and SCC (i.e. irrespective of whether MCC UD-Cfg and/or SCC Ref-Cfg correspond to UD-Cfg #0).

Specifically, when MCC UD-Cfg corresponds to UD-Cfg #0, 1) $I_{PHICH}$ may be set to 0 or 1 according to (UL data transmission) SF for the MCC and $I_{PHICH}$ may be set to 0 for all SFs with respect to the SCC or 2) $I_{PHICH}$ corresponding to all SFs may be set to 0 for both the MCC and SCC (irrespective of SCC Ref-Cfg). When MCC UD-Cfg does not correspond to UD-Cfg #0, $I_{PHICH}$ corresponding to all (UL data transmission) SFs may be set to 0 for both the MCC and SCC (irrespective of SCC Ref-Cfg).

In addition, in the case of PCC (limited to TDD CA for different UD-Cfgs), 1) $I_{PHICH}$ may be set to 0 or 1 according to (UL data transmission) when PCC UD-Cfg corresponds to UD-Cfg #0, and $I_{PHICH}$ may be set to 0 for all SFs or 2) $I_{PHICH}$ may be set to 0 for all SFs irrespective of PCC UD-Cfg when PCC UD-Cfg corresponds to UD-Cfg.

When Ref-Cfg of UG/PHICH timing for a specific CC is set to UD-Cfg (e.g. UD-Cfg #N (N>0)) other than UD-Cfg (e.g. UD-Cfg #0 or UD-Cfg #N (N>0)) of the specific CC or to UD-Cfg #0 (and/or when the MCC corresponds to the SCC (i.e. cross-CC scheduling is not set or non-cross-CC scheduling is set for the specific CC), all the above-described proposed methods may be equally/similarly applied to determine/transmit a PHICH resource corresponding to UL data transmitted through the specific CC.

In the specification, setting of $I_{PHICH}$ to 0 or 1 may mean determining whether to add $N_{PHICH}^{group}$ in PHICH resource index determination (while $I_{PHICH}$ is set according to Ref-Cfg). That is, setting of $I_{PHICH}$ to 0 or 1 may mean determining which one of the following equations will be applied.

$$n_{PHICH}^{group} = (I_{PRB\_RA} + n_{DMRS}) \bmod N_{PHICH}^{group}$$

$$n_{PHICH}^{group} = (I_{PRB\_RA} + n_{DMRS}) \bmod N_{PHICH}^{group} + N_{PHICH}^{group}$$ [Equation 5]

Figure 20:
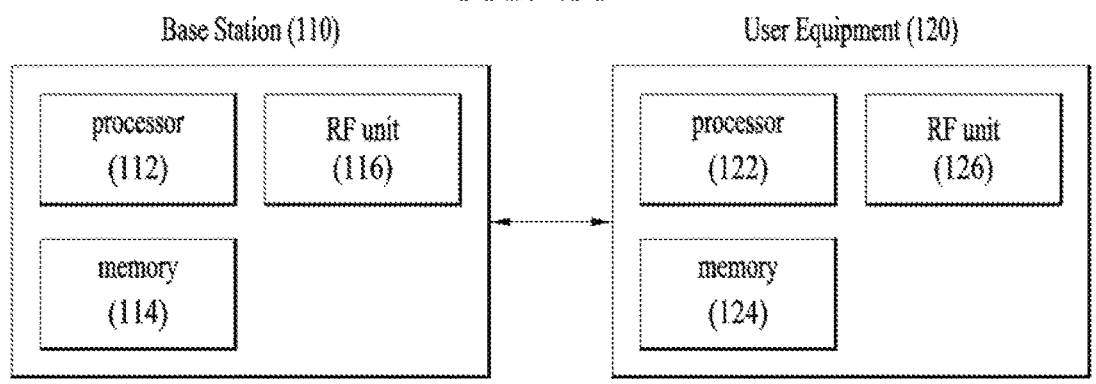
FIG. 20 illustrates a base station and a user equipment applicable to an embodiment of the present invention.

FIG. 20 illustrates a BS and a UE of a wireless communication system, which are applicable to embodiments of the present invention. When the wireless communication system includes a relay, the BS or UE can be replaced by the relay.

Referring to FIG. 20, the wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a UE, BS or other apparatuses (e.g. a relay) of a wireless communication apparatus. Specifically, the present invention is applicable to a method for transmitting control information and an apparatus for the same.

The invention claimed is:

1. A method for performing a data retransmission by a user equipment (UE) in a wireless communication system, the method comprising:
configuring, by the UE, a first cell and a second cell having different subframe patterns, wherein every downlink (DL) subframe of the first cell has only a basic set of hybrid automatic repeat request acknowledgement (HARQ-ACK) resources, and the second cell includes a first uplink (UL) subframe associated with the basic set of HARQ-ACK resources and a second UL subframe associated with an additional set of HARQ-ACK resources;
transmitting, by the UE, data via the second cell based on a UL grant of the first cell; and retransmitting, by the UE, the data according to control information of the first cell,
wherein the data is retransmitted using at least one of a non-adaptive retransmission procedure or an adaptive retransmission procedure when the data is transmitted in the first UL subframe of the second cell, and
wherein the data is retransmitted using only the adaptive retransmission procedure when the data is transmitted in the second UL subframe of the second cell.

2. The method of claim 1, wherein the non-adaptive retransmission procedure is performed based on a physical hybrid ARQ indicator channel (PHICH), and the adaptive retransmission procedure is performed based on an UL grant.

3. The method of claim 1, wherein the data is retransmitted based on at least one of a PHICH and an UL grant when the data is transmitted in the first subframe of the second cell, and
wherein the data is retransmitted only based on an UL grant when the data is transmitted in the second subframe of the second cell.

4. The method of claim 1, wherein the second cell has a subframe pattern of Time Division Duplex (TDD) UL-DL configuration #0 as shown below:

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein D indicates a DL subframe, U indicates a UL subframe, and S indicates a special subframe.

5. The method of claim 4, wherein the first cell has a subframe pattern of any one of TDD UL-DL configuration #1 to #6.

6. The method of claim 1, wherein the UL grant includes UL scheduling information for the first UL subframe or the second UL subframe, the first UL subframe preceding the second UL subframe.

7. The method of claim 1, wherein the first cell is a scheduling cell and the second cell is a scheduled cell.

8. The method of claim 1, wherein the data is transmitted through a physical uplink shared channel (PUSCH).

9. A user equipment (UE) configured to perform a hybrid automatic repeat request (HARQ) process in a wireless communication system, the UE comprising:
a radio frequency (RF) unit; and
a processor operatively connected to the RF unit and configured to:
configure a first cell and a second cell having different subframe patterns, wherein every downlink (DL) subframe of the first cell has only a basic set of hybrid automatic repeat request acknowledgement (HARQ-ACK) resources, and the second cell includes a first uplink (UL) subframe associated with the basic set of HARQ-ACK resources and a second UL subframe associated with an additional set of HARQ-ACK resources,
transmit data via the second cell based on a UL grant of the first cell, and
retransmit the data according to control information of the first cell,
wherein the data is retransmitted using at least one of a non-adaptive retransmission procedure or an adaptive retransmission procedure when the data is transmitted in the first UL subframe of the second cell, and
wherein the data is retransmitted using only the adaptive retransmission procedure when the data is transmitted in the second UL subframe of the second cell.

10. The UE of claim 9, wherein the non-adaptive retransmission procedure is performed based on a physical hybrid ARQ indicator channel (PHICH), and the adaptive retransmission procedure is performed based on an UL grant.

11. The UE of claim 9, wherein the data is retransmitted based on at least one of a PHICH and an UL grant when the data is transmitted in the first subframe of the second cell, and
wherein the data is retransmitted only based on an UL grant when the data is transmitted in the second subframe of the second cell.

12. The UE of claim 9, wherein the second cell has a subframe pattern of Time Division Duplex (TDD) UL-DL configuration #0 as shown below:

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein D indicates a DL subframe, U indicates a UL subframe, and S indicates a special subframe.

13. The UE of claim 12, wherein the first cell has a subframe pattern of any one of TDD UL-DL configuration #1 to #6.

14. The UE of claim 9, wherein the UL grant includes UL scheduling information for at least one of the first UL subframe or the second UL subframe, the first UL subframe preceding the second UL subframe.

15. The UE of claim 9, wherein the first cell is a scheduling cell and the second cell is a scheduled cell.

16. The UE of claim 9, wherein the data is transmitted through a physical uplink shared channel (PUSCH).

* * * * *